United States Patent
Martin et al.

(10) Patent No.: US 7,094,826 B2
(45) Date of Patent: Aug. 22, 2006

(54) AQUEOUS HYPERBRANCHED MACROMOLECULE COATING COMPOSITIONS

(75) Inventors: Emilio Martin, Waalwijk (NL); Gerardus Cornelis Overbeek, Waalwijk (NL); Pablo Steenwinkel, Waalwijk (NL); Ronald Tennebroek, Waalwijk (NL)

(73) Assignee: DSM IP Assets B.V., Heerien (NL)

( * ) Notice: Subject to any disclaimer, the term of this patent is extended or adjusted under 35 U.S.C. 154(b) by 77 days.

(21) Appl. No.: 10/381,811

(22) PCT Filed: Oct. 11, 2001

(86) PCT No.: PCT/GB01/04516

§ 371 (c)(1),
(2), (4) Date: Mar. 31, 2003

(87) PCT Pub. No.: WO02/32982

PCT Pub. Date: Apr. 25, 2002

(65) Prior Publication Data

US 2004/0030031 A1    Feb. 12, 2004

(30) Foreign Application Priority Data

Oct. 14, 2000  (GB)  .................. 0025211.4

(51) Int. Cl.
C08J 3/00    (2006.01)
C08K 3/20    (2006.01)
C08L 51/00   (2006.01)
C08L 75/00   (2006.01)
C08G 65/333  (2006.01)

(52) U.S. Cl. ............. 524/502; 523/406; 523/407; 524/504; 524/507; 524/539; 524/508; 524/513; 524/514; 524/515; 524/517; 524/540; 524/591; 524/600; 524/612; 524/839; 524/840; 524/845; 524/846

(58) Field of Classification Search ............... 524/504, 524/507, 539, 591, 600, 612, 839, 840, 845, 524/846, 502, 508, 513, 514, 515, 517, 540; 523/406, 407

See application file for complete search history.

(56) References Cited

OTHER PUBLICATIONS

Pettersson, Bo, "Hyperbranched polymers: unique design tools for multi-property control in resins and coatings", Pigment & Resin Technology, vol. 25, No. 4, 1996, pp. 4-14, XP-00925879.

XP-002184990, Novel hyperbranched resins for coating applications, Compendex/EL, ISSN 0300-9440.

Schmaljohann, D., "New coating systems based on vinyl ether- and oxetane- modified hyperbranched polyesters", Macromol. Mater. Eng. 275, XP002928808.

*Primary Examiner*—Patrick D. Niland
(74) *Attorney, Agent, or Firm*—Morgan Lewis & Bockius LLP

(57) ABSTRACT

An aqueous coating composition comprising a crosslinkable water-dispersible hyperbranched macromolecule(s) wherein the composition when drying has an open time of at least 20 minutes, a wet edge time of at least 10 minutes, a tack free time $\leq 15$ hours, a dust free time $\leq 5$ hours and an equilibrium viscosity of $\leq 5{,}000$ Pa·s at any solids content when drying in the range of from 20 to 55% by weight using any shear rate in the range of from $9\pm0.5$ to $90\pm5$ s$^{-1}$ and at $23\pm2°$ C.

19 Claims, 2 Drawing Sheets

Shear rate = 0.0997 s⁻¹

Shear rate = 0.990 s⁻¹

AQUEOUS HYPERBRANCHED MACROMOLECULE COATING COMPOSITIONS

The present invention relates to certain aqueous ambient temperature crosslinkable and shelf stable hyperbranched macromolecule compositions which, inter alia, provide coatings having improved open and wet edge times as well as good tack-free and dust-free times.

A general need when applying a decorative or protective coating to a substrate is to be able to repair irregularities in the still-wet coating after some time has elapsed, for example by re-brushing over a freshly coated wet substrate, or by applying more of the coating composition over a previously coated substrate either over the main area of the coating or an edge of the coating or even blending a drop into the coating without vitiating the complete merging of any boundaries in the vicinity of the repaired irregularity. Traditionally compositions containing binder polymers dissolved in organic solvents are used and the organic solvents are employed to modify the drying characteristics of the coated composition. For example, organic solvent based alkyds with an open time of 30 to 45 minutes are available in the decorative "Do-it-yourself" DIY market. However the disadvantage of organic solvent based coatings is the toxic and flammable nature of such solvents and the pollution and odour caused on evaporation as well as the relatively high cost of organic solvents.

Thus with the continuing concern about the use of organic solvent based coating compositions there has been a long felt need for an aqueous coating composition with comparable properties to those achievable using organic solvent based compositions.

Unfortunately, aqueous polymer coating compositions currently known to the art do not offer a combination of drying properties which would make them fully comparable (or even superior to) solvent-based coatings, and in particular do not provide desirably long open and wet edge times (as discussed above and also later) together with desirably short tack-free times (discussed later).

Thus, very commonly, aqueous-based polymer coating compositions employ dispersed high molecular weight polymers as the binder materials thereof. This results in, inter alia, a short wet edge time when the coating composition is dried because the dispersed polymer particles tend to coalesce in the edge region of an applied coating very soon after a wet coating has been applied (probably due to the maximum packing fraction of the polymer particles having been reached) to form a continuous film, and since the polymer of this film is of high viscosity because of its high molecular weight, the lapping (i.e. wet edge) time of the composition is poor.

It has been shown by viscosity measurements taken during drying that existing alkyd emulsions have a high viscosity phase inversion peak during drying. (Phase inversion is defined as the transition from a binder in a continuous water phase to water in a continuous binder phase which occurs during drying). The consequence is a difficulty in re-brushing which starts a few minutes after application of the coating.

It is known from the prior art that longer wet edge or open time is achievable by using solution-type aqueous oligomers (U.S. Pat. No. 4,552,908) which can be diluted with large amounts of organic solvent(s) in order to create a low viscosity continuous phase during drying of the film. However, these systems have high Volatile Organic Contents (VOC's) and are generally unacceptably water-sensitive.

Open time can also be prolonged by using evaporation suppressants (such as e.g. eicosanol), as described in for example EP 210747. However, water sensitivity is also a problem in this case. Moreover, the wet edge open time is insufficiently improved by using such evaporation suppressants.

From the literature it is also known that open time is easily prolonged by using low solids contents in the aqueous polymer compositions, but this generally results in the need to apply many layers of paint (for good opacity). In addition, the wet edge time is generally only moderately influenced by reducing the solids content of an aqueous coating composition with water.

Longer times for repairing irregularities can be achieved by employing aqueous coating compositions in which the binder polymers have very low viscosities. However, hitherto, a problem with such low viscosity polymer binders, is that the resultant coatings have a slow drying rate, resulting in the coating remaining tacky for an unacceptably long time. A coating should also preferably dry sufficiently quickly to avoid the adherence of dust and to ensure that the coating quickly becomes waterproof (in case of outdoor applications), and as discussed above quickly becomes tack-free and sufficiently hard.

Indeed, the difficulty in developing aqueous polymer coating compositions having a desirable combination of drying properties when coated onto a substrate has been particularly discussed in a recent interview given by Professor Rob van der Linde (Professor of Coatings Technology, University of Technology, Eindhoven, NL) and Kees van der Kolk (Sigma Coatings) and reported in "Intermediair" 10.06.1999, 35(23), pages 27–29. In this interview, concerning environmentally friendly paints, there is described the problem of applying aqueous paints where even the professional painter has little enough time to correct any irregularities when needed. This is contrasted (in the interview) with solvent-based paints (e.g. alkyd paints) which are workable for a much longer time but have the disadvantage that the organic solvents, forming a major component of such compositions, are toxic and expensive. The interview also mentions that in the coming years, three universities will cooperate in a project to overcome the drying disadvantages of aqueous paints. Thus this interview emphasises the current and continuing need and desirability for achieving aqueous polymer coatings compositions having improved drying properties.

The open time for a coating composition is, in brief, the period of time that the main area (the bulk) of an applied aqueous coating remains workable after it has been applied to a substrate, in the sense that during this period re-brushing or application of more coating over the main area of a freshly coated wet substrate is possible without causing defects such as brush marks in the final dried coating. (A more formal definition of open time is provided later in this specification).

The wet edge time for a coating composition is the period of time that the edge region of an applied aqueous coating remains workable after it has been applied to a substrate, in the sense that during this period re-brushing or application of more coating over the edge region of a freshly coated wet substrate is possible without causing defects such as lap lines in the final dried coating. (A more formal definition of wet edge time is provided later in this specification).

U.S. Pat. No. 5,418,301 discloses a polyester dendritic macromolecule comprising a polyol central molecule which is extended with carboxylic acid group functional molecules carrying hydroxyl functional groups to give a number of generations. The resulting hydroxy functional dendritic molecule is then further reacted with unsaturated fatty acid and dispersed in water. However the resulting composition does not give the required property balance of a good open time and good wet edge time and yet still give good dust and tack free times.

We have now invented aqueous polymer coating compositions having a very advantageous combination of drying properties, particularly with regard to open time, wet edge time and tack-free time and dust free time as discussed above, and which (surprisingly in view of the comments by van der Linde and van der Kolk) avoid the drawbacks of the currently available compositions.

According to the present invention there is provided an aqueous coating composition comprising a crosslinkable water-dispersible hyperbranched macromolecule(s) wherein said composition when drying to form a coating has the following properties:
  i) an open time of at least 20 minutes;
  ii) a wet-edge time of at least 10 minutes;
  iii) a tack-free time of $\leq 15$ hours;
  iv) a dust-free time of $\leq 5$ hours;
  v) 0 to 25% of co-solvent by weight of the composition; and
  vi) an equilibrium viscosity of $\leq 5,000$ Pa·s, at any solids content when drying in the range of from 20 to 55% by weight of the composition, using any shear rate in the range of from $9\pm0.5$ to $90\pm5$ s$^{-1}$ and at $23\pm2°$ C.

Open time is more formally defined as the maximum length of time, using the test method, under the specified conditions described herein, in which any brush carrying the aqueous composition of the invention can be applied to the main area of a coating of the aqueous composition of the invention after which the coating flows back so as to result in a homogenous film layer.

Preferably the open time is at least 25 minutes, more preferably at least 30 minutes and most preferably at least 35 minutes.

Wet edge time is more formally defined as the maximum length of time, using the test method, under the specified conditions described herein, in which a brush carrying the aqueous composition of the invention can be applied to the edge region of a coating of the aqueous composition of the invention after which the coating flows back without leaving any lap lines so as to result in a homogenous film layer.

Preferably the wet-edge time is at least 12 minutes, more preferably at least 15 minutes, still more preferably at least 18 minutes, especially at least 20 minutes and most especially at least 30 minutes.

The drying process can be divided in four stages namely the period of time necessary to achieve dust-free, tack-free, sandable and thumb-hard coatings using the is test methods described herein.

Preferably the dust free time is $\leq 4$ hours, more preferably $\leq 2$ hours and most preferably $\leq 50$ minutes.

Preferably the tack-free time is $\leq 12$ hours, more preferably $\leq 10$ hours and most preferably $\leq 8$ hours.

Preferably the thumb hard time is $\leq 48$ hours, more preferably $\leq 24$ hours, most preferably $\leq 16$ hours and especially $\leq 10$ hours.

Preferably the resultant coating is sandable within 72 hours, more preferably within 48 hours, still more preferably within 24 hours and especially within 16 hours.

A co-solvent as is well known in the coating art, is an organic solvent employed in an aqueous composition to improve the drying characteristics thereof the co-solvent may be solvent incorporated or used during preparation of the hyperbranched macromolecule(s) or may have been added during formulation of the aqueous composition.

The equilibrium viscosity of the aqueous coating composition when measured under the conditions as described above, is a suitable method for illustrating the drying characteristics of the aqueous coating composition. By the equilibrium viscosity of an aqueous composition at a particular shear rate and solids content is meant the viscosity measured when the aqueous composition has been subjected to the shear rate for long enough to ensure that the viscosity measurement has reached a constant value.

If the composition is to remain brushable and workable during drying so that it has the desired open time and wet edge time, it is necessary that its equilibrium viscosity does not exceed defined limits during the drying process and hence over a range of solids contents. Accordingly the crosslinkable water-dispersible hyperbranched macromolecule(s) which are used in this invention do not give a significant phase inversion viscosity peak, if any at all, during the drying process when the system inverts from one in which water is the continuous phase to one in which the crosslinkable water-dispersible hyperbranched macromolecule(s) is the continuous phase.

The shear rate to measure the equilibrium viscosity is preferably any shear rate in the range of from $0.9\pm0.05$ to $90\pm5$ s$^{-1}$, more preferably any shear rate in the range of from $0.09\pm0.005$ to $90\pm5$ s$^{-1}$.

Preferably the equilibrium viscosity of the aqueous coating composition of the invention is $\leq 3000$ Pa·s, more preferably $\leq 1500$ Pa·s, still more preferably $\leq 500$ Pa·s, especially $\leq 100$ Pa·s and most especially $\leq 50$ Pa·s, when measured as defined above.

Preferably, the composition of the invention has an equilibrium viscosity $\leq 5,000$ Pa·s when measured using any shear rate in the range of from $0.09\pm0.005$ to $90\pm5$ s$^{-1}$, and an equilibrium viscosity of $\leq 3,000$ Pa·s when measured using any shear rate in the range of from $0.9\pm0.05$ to $90\pm5$ s$^{-1}$, and an equilibrium viscosity of $\leq 1,500$ Pa·s when measured using any shear rate in the range of from $9\pm0.5$ to $90\pm5$ s$^{-1}$, at any solids content when drying in the range of from 20 to 55% by weight of the composition and at $23\pm2°$ C.

More preferably, the composition of the invention has an equilibrium viscosity of $\leq 3,000$ Pa·s when measured using any shear rate in the range of from $0.09\pm0.005$ to $90\pm5$ s$^{-1}$, and an equilibrium viscosity of $\leq 1,500$ Pa·s when measured using any shear rate in the range of from $0.9\pm0.05$ to $90\pm5$ s$^{-1}$, and an equilibrium viscosity of $\leq 500$ Pa·s when measured using any shear rate in the range of from $9\pm0.5$ to $90\pm5$ s$^{-1}$, at any solids content when drying in the range of from 20 to 55% by weight of the composition and at $23\pm2°$ C.

Most preferably, the composition of the invention has an equilibrium viscosity of $\leq 1500$ Pa·s when measured using any shear rate in the range of from $0.09\pm0.005$ to $90\pm5$ s$^{-1}$ and an equilibrium viscosity of $\leq 200$ Pa·s when measured using any shear rate in the range of from $0.9\pm0.05$ to $90\pm5$ s$^{-1}$, and an equilibrium viscosity of $\leq 100$ Pa·s when measured using any shear rate in the range of from $9\pm0.5$ to $90\pm5$ s$^{-1}$, at any solids content when drying in the range of from 20 to 55% by weight of the composition and at $23\pm2°$ C.

Preferably the solids content of the aqueous coating composition when determining the equilibrium viscosity is in the range of from 20 to 60%, more preferably in the range of from 20 to 65%, still more preferably in the range of from 20 to 70%, and especially in the range of from 20 to 75% by weight of the composition.

Preferably the equilibrium of the composition of the invention is ≦5000 Pa·s, more preferably ≦3000 Pa·s when measured using any shear rate in the range of from 0.9±0.05 to 90±5 s$^{-1}$, more preferably using any shear rate in the range of from 0.09±0.005 to 90±5 s$^{-1}$; after a 12%, preferably a 15% and most preferably a 18% increase in the solids content by weight of the composition.

A 12% increase in the solids content by weight of the composition means for example going from a solids content of 35 to 47% by weight of the composition.

In a preferred embodiment of the present invention said hyperbranched macromolecule(s) has a solution viscosity ≦150 Pa·s, as determined from a 80% by weight solids solution of the crosslinkable hyperbranched macromolecule(s) in at least one of the solvents selected from the group consisting of N-methylpyrrolidone, n-butylglycol and mixtures thereof, at a shear rate of 90±5 s$^{-1}$ and at 50±2° C.

A choice of solvents for determining the solution viscosity of the hyperbranched macromolecule(s) is provided herein because the nature of the hyperbranched macromolecule(s) may affect its solubility.

Preferably the solution viscosity of the crosslinkable hyperbranched macromolecule(s) is ≦80 Pa·s, more preferably ≦35 Pa·s, especially ≦20 Pa·s and most especially ≦14 Pa·s when measured as defined herein.

Alternatively, and more preferably, the solution viscosity of the hyperbranched macromolecule(s) may be measured at 23±2° C., and the crosslinkable hyperbranched macromolecule(s) may thus also be described as having a solution viscosity ≦250 Pa·s, as determined from a 70% by weight solids solution of the crosslinkable hyperbranched macromolecule(s) in a solvent mixture consisting of:
  i) at least one of the solvents selected from the group consisting of N-methylpyrrolidone, n-butylglycol and mixtures thereof;
  ii) water and
  iii) N,N-dimethylethanolamine;
where i), ii) and iii) are in weight ratios of 20/7/3 respectively, using a shear rate of 90±5 s$^{-1}$ and at 23±2° C.

Preferably in the preceding alternative the solution viscosity of the crosslinkable hyperbranched macromolecule(s) preferably ≦100 Pa·s, especially ≦40 Pa·s, more especially ≦25 Pa·s and most especially ≦15 Pa·s, when measured as defined herein at 23±2° C.

If a mixture of N-methylpyrrolidone (NMP) and n-butylglycol (BG) is used, preferably the ratio of NMP:BG is in the range of from 0.01:99.9 to 99.9:0.01, more preferably the ratio of NMP:BG is in the range of from 0.01:99.9 to 10:90 and in the range of from 90:10 to 99.9:0.01, and most preferably the ratio of NMP:BG is in the range of from 0.5:99.5 to 5:95 and in the range of from 95:5 to 99.5:0.5.

In a special embodiment of the present invention the wet edge time in minutes of the aqueous coating composition is at least Q/(wt. % solids of the aqueous coating composition)$^{0.5}$, wherein the solids content of the aqueous coating composition is between 15 and 70 wt. %, more preferably between 30 and 65 wt. % and most preferably between 40 and 60 wt. % and Q is a constant of 84, more preferably of 100, most preferably of 126 and especially of 151.

Hyperbranched macromolecules are often referred to as dendritic species in the art. Hyperbranched macromolecules are three-dimensional highly branched molecules having a tree-like structure. Macromolecules designated as dendrimers are highly symmetric and belong to a particular class of hyperbranched molecules that have a polydispersity index of approximately 1, whereas macromolecules designated as hyperbranched may to a certain degree be asymmetric and yet maintain a tree-like structure. Another class of hyperbranched macromolecules are the so called "star polymers" as described for example in U.S. Pat. No. 5,731,095.

Hyperbranched or dendritic macromolecules normally consist of a nucleus (N), a number of surrounding branching (B) and extension (E) layers and optionally a chain-terminating layer (T), as illustrated below by Formulas (i) and (ii).

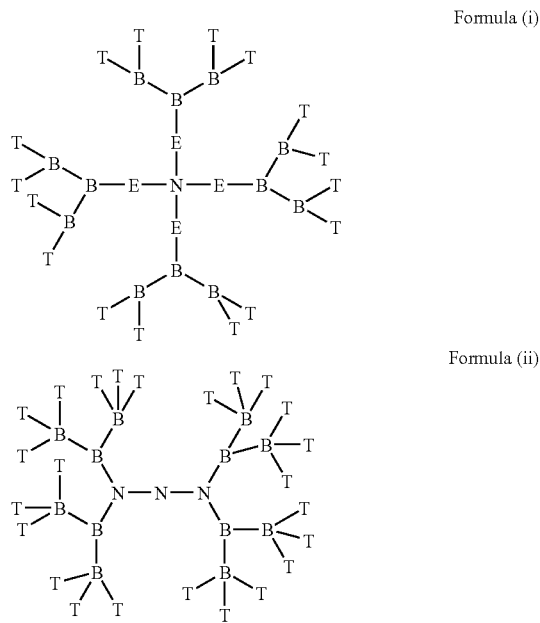

Formula (i)

Formula (ii)

The crosslinkable hyperbranched macromolecule(s) may crosslink at ambient temperature by a number of mechanisms including but not limited to autoxidation, Schiff base crosslinking and silane condensation. By crosslinking by autoxidation is meant that crosslinking results from oxidation occurring in the presence of air and which usually involves a free radical mechanism and is preferably metal catalysed, resulting in covalent crosslinks. By Schiff base crosslinking is meant that crosslinking takes place by the reaction of a carbonyl functional group(s), where by a carbonyl functional group herein is meant an aldo or keto group and including an enolic carbonyl group such as an acetoacetyl group with a carbonyl-reactive amine and/or hydrazine (or blocked amine and/or hydrazine) functional group. Examples of carbonyl-reactive-amine (or blocked amine) functional groups include ones provided by the following compounds or groups: R—NH$_2$, R—O—NH$_2$, R—O—N=C<, R—NH—C(=O)—O—N=C< and R—NH—C(=O)—O—NH$_2$ where R is optionally substituted C$_1$ to C$_{15}$ preferably C$_1$ to C$_{10}$ alkylene, optionally substituted alicyclic or optionally substituted aryl or R may also be part of a polymer. Examples of carbonyl-reactive hydrazine or blocked hydrazine groups include R—NH—NH$_2$, R—C(=O)—NH—NH$_2$, R—C(=O)—NH—N=C<, R—NH—C(=O)—NH—NH$_2$ and R—NH—C(=O)—NH—N=C< where R is as described above. By silane condensation is meant the reaction of alkoxy silane or —SiOH groups in the presence of water, to give siloxane bonds by the elimination of water and/or alkanols (for example methanol) during the drying of the aqueous coating composition.

Preferably the crosslinkable hyperbranched macromolecule(s) is a self-crosslinkable hyperbranched macromolecule(s) (i.e. crosslinkable without the requirement for added compounds which react with groups on the polyester oligomer(s) to achieve crosslinking, although these can still be employed if desired). Preferably the crosslinking is by autoxidation, optionally in combination with other crosslinking mechanisms as discussed herein. Suitably autoxidation is provided for example by fatty acid groups containing unsaturated bonds (by which is meant the residue of such fatty acids which have become incorporated into the polyester oligomer(s) by reaction with their carboxyl groups) or by (meth)allyl functional residues or β-keto ester or β-keto amide groups. Autoxidation may also be provided by carrying out catalytic chain transfer polymerisation on hyperbranched macromolecule(s), resulting in methacryloyl unsaturated end groups. Preferably autoxidation is provided at least by fatty acid groups containing unsaturated bonds.

Preferably the concentration of unsaturated fatty acid groups if present in the autoxidisably crosslinkable hyperbranched macromolecule(s) is 10 to 80%, more preferably 12 to 65%, most preferably 15 to 55% by weight based on the weight of the hyperbranched macromolecule(s). If combined with other autoxidisable groups in the aqueous coating composition, the unsaturated fatty acid group content may be below 10 weight % of the hyperbranched macromolecule(s). For the purpose of determining the fatty acid group content of the hyperbranched macromolecule(s), it is convenient for practical purposes to use the weight of the fatty acid reactant including the carbonyl group but excluding the hydroxyl group of the terminal acid group of the fatty acid. Suitable unsaturated fatty acids for providing unsaturated fatty acid groups in the hyperbranched macromolecule(s) include fatty acids derived from vegetable oils and non-vegetable oils such as soyabean oil, palm oil, linseed oil, tung oil, rapeseed oil, sunflower oil, tallow oil, (dehydrated) castor oil, safflower oil and fatty acids such as linoleic acid, palmitoleic acid, linolenic acid, oleic acid, eleostearic acid, licanic acid, arachidonic acid, ricinoleic acid, erucic acid, gadoleic acid, clupanadonic acid and/or combinations thereof. Particularly preferred is a hyperbranched macromolecule(s) in which the autoxidisable groups are derived only from unsaturated fatty acids. Preferably at least 40% by weight, more preferably at least 60% by weight, of the unsaturated fatty acid groups contain at least two unsaturated groups.

Other crosslinking mechanisms known in the art include the reaction of epoxy groups with amino, carboxylic acid or mercapto groups, the reaction of amine or mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkyleneoxides) with β-diketo (for example acetoacetoxy or acetoamide) groups. The use of blocked crosslinking groups may be beneficial.

The crosslinkable hyperbranched macromolecule(s) may be completely water-soluble or only have partial solubility in water. If the crosslinkable hyperbranched macromolecule(s) is only partially soluble in water the crosslinkable hyperbranched macromolecule(s) preferably has low water solubility in a pH range of from 2 to 10 and is either self-water-dispersible (i.e. dispersible by virtue of a sufficient concentration of selected bound (in-chain, chain-pendant and or chain-terminal) hydrophilic groups built into the crosslinkable hyperbranched macromolecule(s), and thus not requiring high shear techniques and/or added surfactants to produce the dispersion, although such methods can also be included if desired), or is only dispersible in water with the aid of added (i.e. external) surface active agents and/or use of high shear mixing. Low water solubility confers the advantage of a reduced water-sensitivity of the applied coating. Such low water solubility is defined herein as the crosslinkable hyperbranched macromolecule(s) being less than 80% by weight soluble in water throughout the pH range of from 2 to 10 as determined for example by a centrifuge test as described herein. Preferably the crosslinkable hyperbranched macromolecule(s) is $\leq 50\%$ most preferably $\leq 30\%$ by weight soluble in water throughout the pH range of from 2 to 10.

The crosslinkable hyperbranched macromolecule(s) preferably contains a sufficient concentration of bound hydrophilic water-dispersing groups capable of rendering the hyperbranched macromolecule(s) self water-dispersible, but the concentration of such groups is preferably not so great that the hyperbranched macromolecule(s) has an unacceptably high water solubility in order to not compromise the water sensitivity of the final coating.

The type of hydrophilic groups capable of rendering the crosslinkable hyperbranched macromolecule(s) water-dispersible are well known in the art, and can be non-ionic water-dispersing groups or ionic water-dispersing groups. Preferably non-ionic water-dispersing groups are used. Preferred non-ionic water-dispersing groups are polyalkylene oxide groups, more preferably polyethylene oxide groups. A small segment of the polyethylene oxide group can be replaced by propylene oxide segment(s) and/or butylene oxide segment(s), however the polyethylene oxide group should still contain ethylene oxide as a major component. When the water-dispersing group is polyethylene oxide, the preferred ethylene oxide chain length is preferably >8 ethylene oxide units and most preferably >15 ethylene oxide units. Preferably the hyperbranched macromolecule(s) have a polyethylene oxide content of 0 to 50% by weight, most preferably 3 to 42% by weight, especially 7 to 38% by weight and most especially 12 to 35% by weight. Preferably the polyethylene oxide group has a Mw from 175 to 5000 Daltons, more preferably from 350 to 2200 Daltons, most preferably from 660 to 2200 Daltons. Preferably the polyethylene oxide group is a polyethylene glycol (PEG), more preferably (MPEG).

Preferred ionic water-dispersing groups are anionic water-dispersing groups, especially carboxylic, phosphonic and or sulphonic acid groups. The anionic water-dispersing groups are preferably fully or partially in the form of a salt. Conversion to the salt form is optionally effected by neutralisation of the crosslinkable hyperbranched macromolecule(s) with a base, preferably during the preparation of the crosslinkable hyperbranched macromolecule(s) and/or during the preparation of the composition of the present invention. The anionic dispersing groups may in some cases be provided by the use of a monomer having an already neutralised acid group in the hyperbranched macromolecule(s) synthesis so that subsequent neutralisation is unnecessary. If anionic water-dispersing groups are used in combination with a non-ionic water-dispersing group, neutralisation may not be required.

If the anionic water-dispersing groups are neutralised the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised (for example with dimethylsulphate).

Hyperbranched structures are ideal for giving low solution viscosities at any given weight average molecular weight and additionally the use of low molecular weight crosslinkable hyperbranched macromolecule(s) is preferred. Preferably the crosslinkable hyperbranched macromolecule(s) has a weight average molecular weight (Mw) in the range of from 1000 to 120,000 Daltons, more preferably in the range of from 1200 to 80,000 Daltons, most preferably in the range of from 1500 to 50,000 Daltons, and especially in the range of from 2000 to 20,000 Daltons. For the purpose of this invention any molecular species mentioned herein with a Mw <1000 Daltons is classified as either a reactive diluent or as a plasticiser and is therefore not taken into account for the determination of the Mw, Mn or PDi. When Daltons are used to give molecular weight data, it should be understood the this is not a true molecular weight, but a molecular weight measured against polystyrene standards.

Preferably a significant part of any crosslinking reaction only takes place after application of the aqueous coating composition to a substrate, to avoid an excessive molecular weight build up which may lead to an increased viscosity of the aqueous coating composition on the substrate in the early stages of drying.

The molecular weight limits suitable to obtain the preferred low solution viscosity of the crosslinkable hyperbranched macromolecule(s) as defined above may depend in part on the amount and type of co-solvent present in the aqueous composition of the invention, where a higher molecular weight limit is possible when there is more co-solvent in the composition, and the lower molecular weight preferences are more applicable to low or zero co-solvent concentrations.

The molecular weight distribution (MWD) of the crosslinkable hyperbranched macromolecule(s) has an influence on the equilibrium viscosity of the aqueous composition of the invention and hence an influence on the open time. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw crosslinkable hyperbranched macromolecule(s). Preferably the value of PDi is less than 60, more preferably less than 20, most preferably less than 15 and especially less than 10. In a preferred embodiment the value of $Mw \times PDi^{0.8}$ of the crosslinkable hyperbranched macromolecule(s) is $\leq 1,500,000$, more preferably the $Mw \times PDi^{0.8}$ is $\leq 600,000$, still more preferably the $Mw \times PDi^{0.8}$ is $\leq 400,000$, most preferably the $Mw \times PDi^{0.8}$ is $\leq 300,000$.

The crosslinkable hyperbranched macromolecule(s) may comprise a single crosslinkable hyperbranched macromolecule(s) or a mixture of hyperbranched macromolecules. The crosslinkable hyperbranched macromolecule(s) may optionally be used in conjunction with crosslinkable non-hyperbranched macromolecule(s) which has a solution viscosity within the same preferred limits as the solution viscosity of the hyperbranched macromolecule(s). A non-hyperbranched macromolecule(s) may be described as an oligomer(s), where by an oligomer is meant a low molecular weight polymer, preferably with a $Mw \leq 120,000$. Indeed up to 90% by weight of crosslinkable oligomer(s) in the invention composition may be of a non-hyperbranched type. The crosslinkable hyperbranched macromolecule(s) plus, if present, crosslinkable oligomer(s) may optionally be used in conjunction with up to 250% by weight thereof of any type of non-crosslinkable hyperbranched macromolecule(s) and/or non-crosslinkable oligomer(s) provided that non-crosslinkable hyperbranched macromolecule(s) and/or non-crosslinkable oligomer(s) has a solution viscosity within the preferred ranges defined above (for the crosslinkable hyperbranched macromolecule(s)). In such cases, more preferably up to 120 wt. % of the non-crosslinkable hyperbranched macromolecule(s) and/or non-crosslinkable oligomer(s) (based on the weight of crosslinkable hyperbranched macromolecule(s) and crosslinkable oligomer(s) used), still more preferably up to 70 wt. %, especially up to 30%, more especially up to 10 wt. % and most especially 0 wt. %. Oligomer(s) include but are not limited to for example vinyl oligomer(s), polyamide oligomer(s), polyester oligomer(s), polyether oligomer(s), polycarbonate oligomer(s) polysiloxane oligomer(s) and/or polyurethane oligomer(s).

The crosslinkable hyperbranched macromolecule(s) may be prepared by controlled step-growth (condensation) polymerisation and uncontrolled chain-growth (addition) polymerisation. Methods for preparing hyperbranched or dendritic molecules are known in the art and are described in for example in Tomalia et al (Angewandte Chemie International Edition English, 1990, Vol 29, pp 138–175) and the Encyclopaedia of Polymer Science and Engineering, Volume Index 1990, pp 46–92. Methods for preparing hyperbranched macromolecule(s) are also reviewed in U.S. Pat. No. 5,418,301, U.S. Pat. No. 5,663,247, WO 96/19537, WO 96/13558, U.S. Pat. No. 5,270,402, U.S. Pat. No. 5,136,014, U.S. Pat. No. 5,183,862, WO 93/18079, U.S. Pat. No. 5,266,106 and U.S. Pat. No. 5,834,118 and these methods are included herein by reference.

The crosslinkable hyperbranched macromolecule(s) are often derived from a nucleus (or core molecule) having one or more reactive groups to which successive groups of branching and/or chain-extender molecules having at least two reactive groups are added to form branches. Each successive group of branching and/or chain-extender molecules is normally known as a generation. The branches may then be chain-terminated by adding a chain-terminator molecule(s) having one reactive group that is reactive towards a reactive group on the branch. Alternatively the branches can be made first and linked together afterwards to give the hyperbranched macromolecule(s).

When preparing hyperbranched macromolecule(s) some defects are possible and these include inter-macromolecule defects and intra-macromolecule defects such as bridging or looping. Intra-macromolecule defects decrease branching symmetry and inter-macromolecule defects lead to more polydisperse systems. These events may be minimised or eliminated if desired by process optimisation and synthetic strategy optimisation.

The size, shape and properties of hyperbranched macromolecule(s) can be controlled by the choice of the core molecule, the number of generations, the degree of branching and the choice and amount of chain-extender and chain-terminator molecules employed.

The core molecule may affect the hyperbranched macromolecule(s) shape, producing for example spheroid-, comb-cylindrical- or ellipsoid-shaped hyperbranched macromolecule(s). The sequential building of generations determines the nature, function and dimensions of the hyperbranched macromolecule(s).

Examples of core molecules include but are not limited to molecules having one or more carboxylic acid groups (including monofunctional carboxylic acids having at least two hydroxyl groups such as dimethylolpropionic acid), amine groups (including ammonia, polyfunctional amines, such as ethylene diamine, linear and/or branched polyethyleneimines), halide groups, hydroxyl groups (including mono- and polyfunctional alcohols such as pentaerythritol, dipentaerythritol, alkyl glucosides, neopentyl glycol, tris(hydroxymethyl)ethane, trimethylolpropane (TMP), bis-TMP, sorbitol, mannitol, sacharides, sugar alcohols, 1,1,1-tris-(4'-hydroxyphenyl)-ethane, 3,5-dihydroxy-benzyl alcohol) or epoxide groups.

Examples of chain-extender molecules include but are not limited to diisocyanates, diethylene diimine, diols, and carboxylic anhydrides. Examples of branching molecules include but are not limited to, for example, 3,5-dihydroxybenzyl alcohol; monofunctional carboxylic acids having at least two hydroxyl groups, such as dimethylolpropionic acid, and dimethylolbutanoic acid, hydroxyfunctional diacids (or their esters) such as aspartate esters, 5-hydroxy-isophthalic acid, but may also be indirectly obtained, for example through two Michael additions of an acrylate ester or acrylonitrile to one primary amine functional group, or through reaction of a carboxylic acid functional anhydride such as trimellitic anhydride (TMA) with an OH functional group, which results in a diacid functional group. Preferably, the reactive groups within each of the chain-extender and branching molecules have a different reactivity to reduce the amount of crosslinking between the individual hyperbranched molecules, i.e. to control the polydispersity.

Examples of chain-terminator molecules include but are not limited to mono functional molecules (or oligomers) carrying for example epoxide, isocyanate, hydroxyl, thiol, carboxylate, carboxylic anhydride, ester, amides, phosphates, amino, sulphonate and carboxylic acid groups (such as benzoic acid, (meth)acrylic acid, saturated fatty acids and unsaturated fatty acids) which react with the reactive groups on the periphery of the hyperbranched macromolecule(s).

The chain-extender and or chain-terminator molecules may carry for example crosslinker groups and hydrophilic water-dispersing groups which may be introduced directly in the hyperbranched macromolecule(s) by condensation polymerisation, or alternatively crosslinker groups and hydrophilic water-dispersing groups may be reacted onto the hyperbranched macromolecule(s) by any known technique.

Suitable reactive groups of the molecules used in the preparation of hyperbranched macromolecule(s) usually include but are not limited to hydroxyl, carboxylic acid, epoxide, amine, allyl, acryloyl, carboxylic esters, carboxylic anhydrides, silanes, nitriles (which after reduction give amines) and oxazolines.

The crosslinker and/or hydrophilic water-dispersing groups may be introduced into the hyperbranched macromolecule(s) using two general methods: i) by utilising in the polymerisation process to form a hyperbranched macromolecule(s), a branching molecule, a chain-extender molecule and/or chain-terminator molecule carrying a crosslinker group and/or hydrophilic water-dispersing groups; and ii) utilising a molecule chain-extender and/or chain-terminator molecule bearing selected reactive groups and which molecule is subsequently reacted with a molecule carrying a crosslinker group and/or hydrophilic water-dispersing groups and also a reactive group of the type which will react with the selected reactive groups on the hyperbranched macromolecule(s) to provide attachment of the crosslinker group and/or hydrophilic water-dispersing groups to the hyperbranched macromolecule(s) via covalent bonding.

The hyperbranched macromolecule(s) preferably has an acid value of in the range of from 0 to 150 mg KOH/g, more preferably in the range of from 0 to 80 mg KOH/g still especially in the range of from 0 to 40 mg KOH/g and most especially in the range of from 5 to 30 mg KOH/g.

The glass transition temperature (Tg) of the hyperbranched macromolecule(s) may vary within a wide range. The Tg (as measured by modulated differential scanning calorimetry DSC) before any substantial crosslinking has taken place of the hyperbranched macromolecule(s) is preferably in the range of from $-90$ to $+100°$ C. and more preferably in the range of from $-75$ to $+80°$ C. and most preferably in the range of from $-60$ to $+50°$ C.

Surfactants and or high shear can be utilised in order to assist in the dispersion of the hyperbranched macromolecule(s) in water (even if it is self-dispersible). Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount used is preferably 0 to 15% by weight, more preferably 0 to 8%, still more preferably 0 to 5% by weight especially 0.1 to 3% by weight and most especially 0.3 to 2% by weight based on the weight of the crosslinkable hyperbranched macromolecule(s).

The aqueous composition of the invention may optionally but preferably include a polymer(s) dispersed therein which has a Mw $\geq 130,000$ Daltons, (herein termed a "dispersed polymer" for convenience). Preferably the weight average molecular weight of the dispersed polymer(s) in the aqueous polymer dispersion is in the range of from 130,000 to 6,000,000, still more preferably in the range of from 210,000 to 6,000,000, especially in the range of from 300,000 to 2,000,000, more especially in the range of from 250,000 to 2,000,000, and most especially in the range of from 300,000 to 1,500,000 Daltons. If the dispersed polymer(s) is fully pre-crosslinked its Mw will be infinite. Also, in some cases, the synthesis to form the crosslinkable hyperbranched macromolecule(s) may yield, in addition to the hyperbranched macromolecule(s), an amount of very high molecular material. For the purposes of this invention, such material, produced in-situ, is to be considered as a dispersed polymer.

The Mw of the dispersed polymer(s) may be <130,000 Daltons with the proviso that the solution viscosity of the dispersed polymer(s) is >150 Pa·s as determined from an 80% by weight solids solutions of the dispersed polymer(s) in at least one of solvents selected from the group consisting of N-methyl pyrrolidone, n-butylglycol and mixtures thereof at a shear rate of $90\pm5$ $s^{-1}$ and at $50\pm2°$ C.

Preferably the solution viscosity (if measurable) of the dispersed polymer(s) when used in the aqueous composition of the invention is $\geq 250$ Pa·s, more preferably $\geq 500$ Pa·s, and especially $\geq 1000$ Pa·s, as determined from a 80% solids solution of the dispersed polymer(s) in at least one of the solvents selected from the group consisting of N-methylpyrrolidone, n-butylglycol and mixtures thereof using a shear rate of $90\pm 5$ s$^{-1}$ and at $50\pm 2°$ C.

The solution viscosity of the dispersed polymer(s) may not be measurable if for example the weight average molecular weight is so high, so as to render the dispersed polymer(s) insoluble or if the dispersed polymer(s) is fully or partially crosslinked, again rendering the dispersed polymer(s) insoluble.

The dispersed polymer(s) may be film forming or non-film forming at ambient temperature, preferably the dispersed polymer(s) is non-film forming at ambient temperature (ambient temperature as used herein is defined as $23\pm 2°$ C.). Preferably the aqueous composition of the invention does include such a dispersed polymer(s).

The crosslinkable hyperbranched macromolecule(s) can thus be (and preferably is) combined with a dispersed polymer(s) to further improve the provision of a binder system for providing an aqueous composition with the desired balance of long open/wet edge time and reduced tack free and dust free time.

The presence of the crosslinkable hyperbranched macromolecule(s) (as discussed above) provides the defined long open time and wet edge time, whilst the presence of the dispersed polymer(s) (e.g. a polymer latex) appears to assist in reducing the drying time of the composition, even though its presence may not be essential to achieve the defined requirements in this respect.

Accordingly in a further, and preferred, embodiment of the present invention there is provided an aqueous coating composition as defined herein additionally comprising a dispersed polymer(s).

The dispersed polymer(s) may for example be the product of an aqueous emulsion polymerisation or a preformed polymer dispersed in water.

Preferably the dispersed polymer(s) has a measured Tg (using DSC) which is preferably in the range of from −50 to 300° C., more preferably in the range of from 25 to 200° C. and most preferably in the range of 35 to 125° C. If the dispersed polymer(s) is a vinyl polymer, the vinyl polymer may be a sequential polymer, i.e. the vinyl polymer will have more than one Tg. Especially preferred is a vinyl polymer with 10 to 50 wt. % of a soft part with a Tg in the range of from −30 to 20° C. and 50 to 90 wt. % of a hard part of with a Tg in the range of from 60 to 110° C. This combination provides an additional advantage of improved block resistance of the resultant coating, especially when co-solvent levels of 0 to 15 wt. %, more preferably 0 to 5 wt. % and most preferably 0 to 3 wt. %. of the aqueous composition are used. A simple blend of dispersed polymer(s) with low and high Tg's may also be used to achieve the same or similar advantages. Blocking is the well-known phenomenon of coated substrates which are in contact tending to unacceptably adhere to each other, particularly when under pressure, as for example in doors and windows in their respective frames or when stacked.

Preferably the dispersed polymer(s) have an average particle size in the range of from 25 to 1000 nm, more preferably 60 to 700 nm, most preferably 100 to 600 nm and especially in the range of from 175 to 500 nm. The dispersed polymer(s) may also have a polymodal particle size distribution.

The dispersed polymer(s) preferably has a low solubility in the aqueous medium of the composition of the invention, however some of the dispersed polymer(s) may be soluble measurable by the centrifuge test as described herein. Preferably at least 30%, more preferably at least 60%, most preferably at least 90% of the dispersed polymer(s) is present as insoluble polymer over the whole pH range.

The dispersed polymer(s) may for example be vinyl polymer, polyurethane, polyester, polyether, polyamide, polyepoxide, or a mixture thereof. The dispersed polymer(s) may also be a hybrid of two or more different polymer types such as urethane-acrylic polymers (as described in for example U.S. Pat. No. 5,137,961), epoxy-acrylic polymers and polyester-acrylic polymers. The dispersed polymer(s) may also be an organic-inorganic hybrid, for example silica particles grafted with a vinyl polymer(s). Preferably the dispersed polymer(s) is a vinyl polymer.

The dispersed polymer may optionally contain acid groups. The dispersed polymer(s) preferably has an acid value below 100 mgKOH/g, more preferably an acid value below 50 mg/KOH/g, most preferably an acid value below 25 mg KOH/g and especially an acid value below 15 mg KOH/g. The preferred acid value of the dispersed polymer(s) depend on the nature of the crosslinkable hyperbranched macromolecule(s) and the amount of co-solvent in the aqueous composition of the invention. If the hyperbranched macromolecule is hydrophilic, the cosolvent if used is preferably also of a hydrophilic nature and a low acid value of the dispersed polymer(s) is preferred (preferred below 60, more preferably below 40, more preferably below 30, more preferably below 24, most preferably below 15 mg KOH/g). If however a hydrophobic hyperbranched macromolecule is used, for instance based on (at least partly) unsaturated fatty acid and without dispersing groups, the cosolvent is preferentially of a hydrophobic nature (if at all present) and therefore much higher acid values (up to an acid value of 160, more preferred up to 125, most preferred up to 100 mg KOH/g) of the dispersed polymer(s) may be tolerated to give the desired properties.

In a special embodiment, $\leq 15$ wt. % of a co-solvent (based on total binder where the binder includes the oligomer(s) and any dispersed polymer(s) solids) is used, where the dispersed polymer(s) has an acid value below 20 mg KOH/g and the crosslinkable hyperbranched macromolecule(s) is present in an amount (based on total binder polymer solids) of 30 to 65 wt. %, the hyperbranched macromolecule(s) comprising 45 to 70 wt. % of fatty acid groups.

The dispersed polymer(s) may optionally contain hydroxyl groups. If the dispersed polymer(s) is a vinyl polymer comprising polymerised (meth)acrylic monomers then preferably the hydroxyl group content in the vinyl polymer is preferably below 1.0 wt. %, more preferably below 0.5 wt. % and most preferably below 0.2 wt. % based on the weight of the vinyl polymer.

The dispersed polymer(s) may optionally contain amide groups (such groups being for example obtainable from amide functional monomers such as (meth)acrylamide). If the dispersed polymer(s) is a vinyl polymer comprising polymerised (meth)acrylamide monomers, then preferably the amide group content in the vinyl polymer is below 3.0 wt. %, more preferably below 1.5 wt. % and most preferably below 0.6 wt. % based on the weight of the vinyl polymer.

The dispersed polymer(s) may optionally contain wet-adhesion promoting groups such as acetoacetoxy groups; (optionally substituted) amine or urea groups, for example cyclic ureido groups, imidazole groups, pyridine groups, hydrazide or semicarbazide groups.

The dispersed polymer(s) may optionally contain crosslinker groups which allow crosslinking of the dispersed polymer(s) and/or allow participation in the crosslinking reaction of the crosslinkable hyperbranched macromolecule(s), thus speeding up the drying rate and improving the properties of the final coating (e.g. chemical resistance and scratch resistance). Examples of such crosslinker groups include groups which can take part in the autoxidation, and groups which will effect crosslinking other than by autoxidation, for example Schiff base and silane condensation reactions as discussed above for hyperbranched macromolecule(s).

In a preferred embodiment the dispersed polymer(s) contains crosslinker groups which can participate in the preferred autoxidative crosslinking reactions of an autoxidisably crosslinkable hyperbranched macromolecule(s).

In a preferred embodiment the dispersed polymer(s) may be fully or partially pre-crosslinked. If the dispersed polymer(s) is a vinyl polymer pre-crosslinking may be achieved by using polyunsaturated monomers during the vinyl polymer synthesis such as allyl methacrylate, diallyl phthalate, tripropylene glycol di(meth)acrylate, 1,4-butanediol diacrylate and trimethylol propane triacrylate. Allyl methacrylate is most preferred. Alternatively very low levels of initiator may be used, leading to chain-transfer to the vinyl polymer and hence to grafting and high Mw. Other ways to generate pre-crosslinking in a vinyl polymer is to include the use of monomer(s) bearing groups which may react with each other during synthesis to effect pre-crosslinking for example glycidylmethacrylate and acrylic acid.

Vinyl polymers are derived from free radically polymerisable olefinically unsaturated monomers (vinyl monomers) and can contain polymerised units of a wide range of such vinyl monomers, especially those commonly used to make binders for the coatings industry.

Examples of vinyl monomers which may be used to form vinyl polymer(s) include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

$CH_2=CR^1-COOR^2$ wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Olefinically unsaturated monocarboxylic, sulphonic and/or dicarboxylic acids, such as acrylic acid, methacrylic acid, β-carboxy ethyl acrylate, fumaric acid and itaconic acid, (meth)acrylamide, methoxy polyethyleneoxide(meth)acrylate may also be used.

The vinyl monomer may optionally contain functional groups to contribute to the crosslinking of the polymer(s) in the coating. Examples of such groups include maleic, epoxy, fumaric, acetoacetoxy, β-diketone, unsaturated fatty acid, acryloyl, methacryloyl, styrenic, (meth)allyl groups, mercapto groups, keto or aldehyde groups (such as methylvinylketone, diacetoneacrylamide and (meth)acrolein).

Particularly preferred are vinyl polymer(s) made from a monomer system comprising at least 40 weight % of one or more monomers of the formula $CH_2=CR^1COOR^2$ defined above. Such preferred vinyl polymer(s) are defined herein as acrylic polymer(s). More preferably, the monomer system contains at least 50 weight % of such monomers, and particularly at least 60 weight %. The other monomers in such acrylic polymer(s) (if used) may include one or more of the other vinyl monomers mentioned above, and/or may include ones different to such other monomers. Particularly preferred monomers include butyl acrylate, butyl methacrylate, methyl methacrylate, ethyl hexyl methacrylate, esters of (meth)acrylic acid, vinyl and vinylidene chloride, butadiene, acrylonitrile, vinyl acetate and styrene.

If the dispersed polymer(s) is a dispersed vinyl polymer, the dispersed vinyl polymer optionally comprises at least 15 wt. %, more preferably at least 40 wt. % and most preferably at least 60 wt % of polymerised vinyl acetate. If the dispersed vinyl polymer comprises at least 50 wt. % of polymerised vinylacetate then preferably the dispersed vinyl polymer also comprises 10–49 wt. % of either butylacrylate or a branched vinylester, for example Veova 10.

In a preferred embodiment the dispersed vinyl polymer comprises:
I. 15 to 60 wt. % of styrene and/or α-methylstyrene;
II. 15 to 80 wt. % of one or more of methyl methacrylate, ethylmethacrylate, cyclohexyl(meth)acrylate and n-butylmethacrylate;
III. 0 to 5 wt. % of vinyl monomer containing carboxylic acid groups;
IV 0 to 10 wt. %, more preferably 0 to 5 wt % of a vinyl monomer containing non-ionic water dispersing groups;
V 5 to 40 wt. % of vinyl monomers other than as in I to IV, VI and VII;
VI 0 to 5 wt. % of vinyl monomers containing wet adhesion promoters or crosslinker groups (excluding any within the scope of III and VII); and
VII 0 to 8 wt. %, more preferably 0 to 4 wt. %, and most preferably 0.5 to 3 wt. % of a polyethylenically unsaturated vinyl monomer, wherein I)+II) add up to at least 50 wt. % and I+II+III+IV+V+VI+VII add up to 100%.

The dispersed polymer(s) can be prepared by any known technique. Preparation techniques include either dispersing a pre-formed polymer or polymer solution in water or if the polymer is a vinyl polymer directly synthesising the vinyl polymer in water (for example by emulsion polymerisation, micro-suspension polymerisation or mini emulsion polymerisation). Methods for preparing aqueous dispersed polymer(s) are reviewed in the Journal of Coating Technology, volume 66, number 839, pages 89–105 (1995) and these methods are included herein by reference. Preferably dispersed vinyl polymer(s) are prepared by the emulsion polymerisation of free radically polymerisable olefinically unsaturated monomers (Emulsion Polymerisation and Emulsion Polymers, P. Lovell, M. S. El-Aasser, John Wiley, 1997). Any published variant of the emulsion polymerisation process may be utilised to prepare the dispersed polymer(s), including the use of seeded emulsion polymerisation techniques to control particle size and particle size distribution, especially when working in the particle size range 300–700 nm when the seeded technique is useful for giving good particle size control. Other useful techniques are the so called sequential polymerisation technique and the power feed technique (chapter 23 in "Emulsion Polymers and Emulsion Polymerisation" D R Basset and A E Hamielec, ACS Symposium Series No 165, 1981).

Preferably the dispersed polymer(s) is colloid stable and it is also desirable that colloid stability is maintained for as long as possible into the drying process since early loss of colloid stability can bring a premature end to open time. Since the final coating composition may often contain co-solvents and dissolved ionic species (e.g. from pigment dissolution and from the presence of neutralising agents), it is desirable that the colloid stability of the aqueous dispersed polymer(s) is adequate to withstand any destabilising influences of these components. Colloid stability may be achieved by the addition of conventional non-ionic surfactants, optionally with the addition of anionic surfactants at any stage during the preparation of the aqueous composition of the invention. Strongly adsorbing surfactants capable of providing steric stability are preferred. Higher levels of colloid stability may be obtained by chemically binding or partially binding hydrophilic stabilising groups such as polyethylene oxide groups to the surface of dispersed polymer(s) particles. Suitable surfactants and stabilising groups are described in "Non Ionic Surfactants-Physical Chemistry" (M J Schick, M Dekker Inc 1987) and "Polymer Colloids" (Buscall, Corner & Stageman, Elsevier Applied Science Publishers 1985).

Chemical binding (grafting) of hydrophilic stabilising groups onto dispersed polymer(s) particles can be achieved by the use of a comonomer, polymerisation initiator and/or chain transfer agent bearing the stabilising group, for example methoxy(polyethylene oxide)$_{30}$ methacrylate may be introduced as a comonomer into an emulsion polymerisation to give rise to stabilised dispersed polymer particles with bound polyethylene oxide groups on the particle surface. Another method of producing a strongly sterically stabilised dispersed polymer(s) is to introduce cellulosic derivatives (e.g. hydroxy ethyl cellulose) during an emulsion polymerisation (see for example D H Craig, Journal of Coatings Technology 61, no. 779, 48, 1989). Hydrophilic stabilising groups may also be introduced into a preformed polymer before it is subsequently dispersed in water, as described in EP 0317258 where polyethylene oxide groups are reacted into a polyurethane polymer which is subsequently dispersed in water and then chain extended.

The combination of crosslinkable hyperbranched macromolecule(s) and other crosslinkable or non-crosslinkable oligomers if used dispersed polymer(s) is most conveniently prepared by physically blending the corresponding aqueous dispersions. However other methods of preparing the combination can sometimes be utilised. One such method is to prepare the crosslinkable hyperbranched macromolecule(s) in solution as previously discussed, and to disperse this solution directly into a dispersed polymer(s). Alternatively the solvent can be removed from the crosslinkable hyperbranched macromolecule(s) solution, and the dry hyperbranched macromolecule(s) is directly dispersed into a dispersed polymer(s). Another method is to introduce the crosslinkable hyperbranched macromolecule(s) into an aqueous free radical polymerisation reaction which produces the dispersed polymer(s). Such an introduction of crosslinkable hyperbranched macromolecule(s) can either be at the commencement of the aqueous free radical polymerisation or during an aqueous free radical polymerisation.

The crosslinkable hyperbranched macromolecule(s) may also be diluted with reactive diluent (for example vinyl monomers) at any stage of its preparation and then dispersed into a dispersed polymer(s), followed by polymerisation of the reactive diluent in the presence of the hyperbranched macromolecule(s) and the optional polymer dispersion(s). Optionally depending on the nature of the reactive diluent, no further polymerisation of the reactive diluent may be required.

Alternatively the crosslinkable hyperbranched macromolecule(s) and dispersed polymer(s) may be combined by preparing a redispersible dry powder form of the dispersed polymer(s), and then dispersing the redispersible dry powder directly into an aqueous dispersion of the crosslinkable hyperbranched macromolecule(s). Methods for preparing redispersible dry powders from polymer emulsions are described for example in U.S. Pat. No. 5,962,554, DE 3323804 and EP 0398576.

In an embodiment of the invention the crosslinkable hyperbranched macromolecule(s) and the optional dispersed polymer(s) are compatible in the drying aqueous composition. Preferably the crosslinkable hyperbranched macromolecule(s) and the dispersed polymer(s) give clear films upon film formation after coating of the aqueous composition onto a substrate.

Preferably the ratios by weight of solid material of crosslinkable hyperbranched macromolecule(s) and other crosslinkable or non-crosslinkable oligomer(s) if used to the dispersed polymer(s) in the range of from 100:0 to 10:90, more preferably in the range of from 90:10 to 25:75, still more preferably in the range of from 80:20 to 30:70 and especially in the range from 65:35 to 30:70.

The aqueous coating composition of the invention is particularly useful as or for providing the principle component of coating formulations (i.e. composition intended for application to a substrate without further treatment or additions thereto) such as protective, or decorative coating compositions (for example paint, lacquer or varnish) wherein an initially prepared composition may optionally be further diluted with water and/or organic solvents and/or combined with further ingredients, or may be in more concentrated form by optional evaporation of water and/or organic components of the liquid medium of an initially prepared composition. The invention composition can contain co-solvent or a mixture of co-solvents. Preferably the invention composition contains $\leq 18\%$ by weight of cosolvents, more preferably $\leq 10\%$, still more preferably $\leq 3\%$, especially $\leq 1\%$ and most especially 0% by weight based on the invention composition.

Preferably the evaporation rate of the co-solvent is $\leq 0.3$, more preferably, $\leq 0.15$, most preferably $\leq 0.05$, and especially $\leq 0.035$, and values for evaporation rates were published by Texaco Chemical Company in a bulletin Solvent Data; Solvent Properties (1990). These values are relative to the evaporation rate of n-butylacetate for which the evaporation rate is defined as 1.00. Determination of evaporation rates of solvents that are not listed in this bulletin is as described in ASTM D3539;

In a special embodiment, the amount of co-solvent used in the invention composition is preferably linked to the Mw of the crosslinkable hyperbranched macromolecule(s) in the composition. For hyperbranched macromolecule(s) with Mw in the range 1,000 to 50,000 Daltons, the amount of co-solvent is preferably 0 to 15 wt. % based on the weight of the composition, more preferably 0 to 10 wt. %. For hyperbranched macromolecule(s) with Mw in the range >50,000 to 120,000 Daltons, the corresponding figures for the preferred amount of co-solvent are 0 to 25 wt. %, more preferably 5 to 20 wt. %.

Furthermore, there is also a preferred relationship between the amount of co-solvent used and the amount of binder polymer solids, viz the amount of co-solvent is preferably ≦50 wt. % based on the weight of binder polymer solids in the composition, more preferably ≦35 wt. %, more preferably ≦20 wt. %, more preferably ≦10 wt. %, and especially preferably 0 wt. %

An advantage of the current invention is that co-solvent can, if as is often required for environmental and safety reasons, be present at a very low concentrations because of the plasticising nature of the crosslinkable hyperbranched macromolecule(s). Preferably the solvent to water ratio is below 1.0, more preferably below 0.5, most preferably below 0.3 and especially below 0.15. The co-solvent(s) can all be added at the final formulation step. Alternatively some or all of the co-solvent in the final formulation can be the co-solvent utilised in the preparation of the crosslinkable hyperbranched macromolecule(s). An important consideration when choosing a co-solvent is whether or not the co-solvent is compatible with the crosslinkable hyperbranched macromolecule(s) and/or the dispersed polymer(s) and the effect of any co-solvent partitioning (and the partitioning of the co-solvent in the (aqueous) hyperbranched macromolecule phase versus the dispersed polymer particles is preferably >1/1, more preferably >2/1 and most preferably >3/1). If the co-solvent is more compatible with the polymer it will swell the polymer, thus increasing the overall viscosity. Preferably any co-solvent present in the aqueous composition of the invention is more compatible with the hyperbranched macromolecule(s) than with the dispersed polymer(s), so that the dispersed polymer(s) undergoes little if any swelling by the co-solvent. The co-solvent selection is often determined by experimentation and/or by the use of a solubility parameter concept i.e. maximising the difference in the solubility parameter of the dispersed polymer(s) and solvent leads to a minimisation of the co-solvent uptake by the dispersed polymer(s). Solubility parameters of a range of solvents and a group contribution method for assessing the solubility parameters of polymers are given by E A Grulke in the "Polymer Handbook" (John Wiley pages 519–559, 1989) and by D W Van Krevelen and P J Hoftyzer in "Properties of Polymers. Correlations With Chemical Structure" (Elsevier, New York, 1972 chapters 6 and 8). Co-solvent uptake of the dispersed polymer(s) may be decreased by increasing the Tg so that the dispersed polymer(s) is in the glassy region at ambient temperature, or by pre-crosslinking the dispersed polymer(s) as described above. Other ways of introducing pre-crosslinking into dispersed polymer(s) are known in the art, for example U.S. Pat. No. 5,169,895 describes the preparation of pre-crosslinked polyurethane aqueous dispersions by the use of tri-functional isocyanates in the synthesis.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings, for example decorative paints, on wood and board. The aqueous carrier medium is removed by natural drying or accelerated drying (by applying heat) to form a coating.

According in a further embodiment of the invention there is provided a coating obtainable from an aqueous coating composition of the present invention.

A known problem with many autoxidisable coating compositions is that the resultant coatings have a tendency to yellow, in particular where the autoxidisable groups are derived from polyunsaturated fatty acids, such as for example tung oil, linolenic acid, eleostearic acid, arachidonic acid, clupanadonic acid, and fatty acids obtainable from dehydrated castor oil. This may be unacceptable depending on the desired colour of the resultant coating. Preferably the aqueous composition has a starting yellowness value of less than 10, more preferably less than 7 and most preferably less than 4, measured as described herein. Preferably the aqueous composition has an increase in yellowing in darkness of less than 7, more preferably less than 5, most preferably less than 3 and preferably the aqueous composition has an increase in yellowing in daylight of less than 4, preferably less than 3 and more preferably less than 2 as measured by the test method described herein. Furthermore, the absolute yellowness (i.e. yellowness at start plus yellowness due to ageing) of the aqueous composition is preferably less than 12, more preferably less than 10, still more preferably less than 8 and especially less than 6.

In a further embodiment of the present invention there is provides an aqueous coating composition as defined herein comprising:

i) 3 to 26% of a crosslinkable hyperbranched macromolecule(s) and/or crosslinkable oligomer(s) by weight of the composition of which at least 52 wt % is a crosslinkable hyperbranched macromolecule(s);

ii) 0 to 6.5% of a non-crosslinkable oligomer(s) by weight of the composition;

iii) 10 to 56% of dispersed polymer(s) by weight of the composition;

iv) 0 to 15% of co-solvent by weight of the composition;

v) 5 to 65% of water by weight of the composition;

where i)+ii)+iii)+iv)+v)=100%.

In another embodiment of the present invention there is provided an aqueous coating composition as defined herein comprising:

i) 15 to 40% of a crosslinkable hyperbranched macromolecule(s) and/or crosslinkable oligomer(s) by weight of crosslinkable hyperbranched macromolecule(s), crosslinkable oligomer(s), non-crosslinkable oligomer(s) and dispersed polymer(s) of which at least 52 wt % is a crosslinkable hyperbranched macromolecule(s);

ii) 0 to 10% of a non-crosslinkable oligomer(s) by weight of crosslinkable hyperbranched macromolecule(s), crosslinkable oligomer(s), non-crosslinkable oligomer(s) and dispersed polymer(s);

iii) 50 to 85% of dispersed polymer(s) by weight of crosslinkable hyperbranched macromolecule(s), crosslinkable oligomer(s), non-crosslinkable oligomer(s) and dispersed polymer(s):

where i)+ii)+iii)=100%.

The aqueous coating composition of the invention may contain other conventional ingredients including pigments, dyes, emulsifiers, surfactants, plasticisers, thickeners, heat stabilisers, levelling agents, anti-cratering, agents, fillers, sedimentation inhibitors, UV absorbers, antioxidants, dispersants, flow agents, defoamers, adhesion promoters, crosslinking agents, co-solvents, wetting agents and the like introduced at any stage of the production process or subsequently. It is possible to include an amount of antimony oxide in the dispersions to enhance the fire retardant properties. Optionally external crosslinking agent(s) may be added to the aqueous composition of the invention to aid crosslinking during drying. Examples of reactive functional groups which may be utilised for external crosslinking agent(s) include but are not limited to hydroxyl functional groups, reacting with isocyanate (optionally blocked), melamine, or glycouril functional groups; keto, aldehyde and/or acetoacetoxy carbonyl functional groups reacting with amine or hydrazine functional groups; carboxyl functional groups reacting with aziridine, epoxy or carbodiimide functional groups; silane functional groups reacting with silane functional groups; epoxy functional groups reacting with amine or mercaptane groups as well as carboxyl functional groups undergoing metal ion (such as zinc) crosslinking.

In particular, the aqueous coating compositions of the invention (if autoxidisable) and formulations containing them advantageously include a drier salt(s). Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salt(s) in the composition is typically that to provide an amount of metal(s) within the range of from 0.01 to 0.5% by weight based on the weight of autoxidisable hyperbranched macromolecule(s) and or autoxidisable dispersed polymer(s).

Drier salts are conventionally supplied as solutions in white spirit for use in solvent-borne alkyd systems. They may, however, be used quite satisfactorily in aqueous coating compositions since they can normally be dispersed in such systems fairly easily. The drier salt(s) may be incorporated into the aqueous coating composition at any convenient stage. For example the drier salt(s) may be added prior to dispersion into water. Drier accelerators may be added to the drier salts. Suitable drier accelerators include 2,2-bipyridyl and 1,10-phenanthroline.

If desired the aqueous dispersion of the invention can be used in combination with other polymer dispersions or solutions which are not according to the invention.

FIG. 1 shows the drying profile measured using a shear rate of 0.0997 $s^{-1}$.

FIG. 2 shows the drying profile measured using a shear rate of 0.990 $s^{-1}$.

FIG. 3 shows the drying profile measured using a shear rate of 9.97 $s^{-1}$.

FIG. 4 shows the drying profile measured using a shear rate of 78.6 $s^{-1}$.

Figure 1:
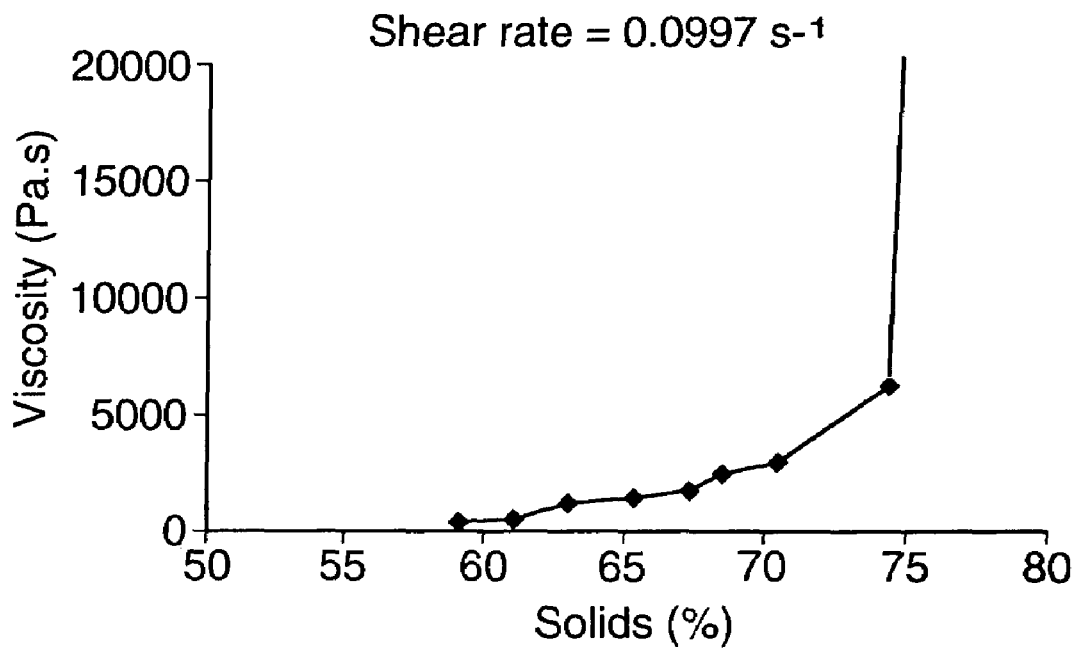
FIGS. 1 to 4 illustrate a drying profile of a coating composition of the present invention [Example 12] where the equilibrium viscosity is measured as the solids content increases.

The present invention is now illustrated by reference to the following examples. Unless otherwise specified, all parts, percentages and ratios are on a weight basis. The prefix C before an example denotes that it is comparative. The term "working" means that the example is according to the invention. The term "non-working" means that it is not according to the invention (i.e. comparative).

Test Methods:

To test the open time and wet edge time aqueous compositions as prepared in the examples below were applied-using a wire rod to a test chart (18×24 cm, form 8B—display, available from Leneta Company) at a wet film thickness of 120 μm. Wet edge time and open time measurements were performed at fairly regular time intervals at according to the approximate expected final time in each case (being determined roughly from a trial run), the intervals between measurements decreasing towards the end of the run. The measurements were carried out relative humidity levels of 50+/−5%, temperatures of 23+/−2° C. and an air flow $\leq 0.1$ m/s.

Open Time:

The open time was determined by brushing at regular intervals (as mentioned above) a virgin 75 $cm^2$ area of the coated chart with a brush (Monoblock no 12, pure bristles/polyester 5408-12) carrying some more of the composition with a brush pressure of 100–150 g during 30 seconds. In this time the brush was moved in one set comprising 5 times in the direction of the width of the substrate and 5 times in the direction of length of the substrate before the homogeneity of the coating was visually assessed. Once the composition carried on the brush no longer formed a homogeneous layer with the coating on the substrate the open time was considered to be over.

Wet Edge Time:

The wet edge time was determined by brushing at regular time intervals (as mentioned above) a virgin 25 $cm^2$ edge area of the coated chart with a brush (Monoblock no 12, pure bristles/polyester 5408-12) carrying some more of the composition with a brush pressure of 100–150 g during 30 seconds. In this time the brush was moved in one set comprising 5 times in the direction of the width of the substrate and 5 times in the direction of length of the substrate before the homogeneity of the coating was visually assessed. Once the composition carried on the brush no longer formed a homogeneous layer with the coating on the substrate and/or a visible lap line could be seen the wet edge time was considered to be over.

Drying Time:

To test the dust-free, tack-free and thumb-hard drying stages the composition as prepared in the examples below, was applied to a glass plate at a wet film thickness of 80 μm. Drying time tests were performed at regular time intervals at relative humidity levels of 50+/−5%, temperatures of 23+/−2° C. and an air flow $\leq 0.1$ m/s.

Dust-free Time:

The dust-free time was determined by dropping a piece of cotton wool (about 1 $cm^3$ i.e. 0.1 g) onto the drying film from a distance of 25 cm. If the piece of cotton wool could be immediately blown from the substrate by a person without leaving any wool or marks in or on the film, the film was considered to be dust-free.

Tack-free Time:

The tack-free time was determined by placing a piece of cotton wool (about 1 $cm^3$, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Thumb-hard Time:

The thumb-hard time was determined by placing the coated glass plate on a balance and a thumb was pressed on the substrate with a pressure of 7 kg. The thumb was then rotated 90° under this pressure. If the film was not damaged the coating was dried down to the substrate level and considered to be thumb-hard.

Sandability

Sandability corresponds to the hardness of a coating at the point in the Examples when a coating can be sanded properly. The composition prepared in the Examples as described below applied to a piece of wood at a wet film thickness of 120 µm. The coating was abraded by hand with sandpaper grain delicacy p150 at regular time intervals at relative humidity levels of 50+/−5%, temperatures of 23+/−2° C. and an air flow $\leq 0.1$ m/s. When there was no significant clogging (or coating started powdering) the coating was considered to be sandable.

Viscosity

All viscosity measurements were performed on a Bohlin Rheometer VOR or a TA Instruments AR1000N Rheometer, using the cup & spindle (C14), cone & plate (CP 5/30) and/or plate & plate (PP15) geometry, depending on the approximate viscosity of the sample to be measured.

Solution Viscosity

For the solution viscosity measurements (both at 50° C. and at ambient temperature, 23° C.), the cone & plate (CP 5/30) geometry was used and the measurements were performed at a shear rate of 92.5 $s^{-1}$. If the hyperbranched macromolecule solutions were too low in viscosity to remain in between the cone and the plate, the Cup & Spindle C14 geometry was used and the viscosity measurements were performed at a shear rate of 91.9 $s^{-1}$. For both geometries, the gap between the Cone and the Plate (or between the Cup and the Spindle) was set to 0.1 mm, prior to each measurement. The solution viscosities of the hyperbranched macromolecules were measured using the solvent systems and the conditions as defined herein in the statements of invention:
1. The 80% solids solution: The hyperbranched macromolecule was diluted (if necessary) with the appropriate solvent to an 80% solids solution (in NMP, BG or a mixture of NMP and BG at any ratio) which was homogenised by stirring the solution for 15 minutes at 50° C.
2. The 70% solids solution: The hyperbranched macromolecule was diluted with the appropriate solvent (or mixture of solvents) to result in a 70% solids solution (either in NMP/water/DMEA or in BG/water/DMEA, or in (a mixture of NMP and BG at any ratio)/water/DMEA; in both solvent mixtures the solvents should be present in a weight ratio of 20/7/3, respectively) which was homogenised by stirring the solution for 15 minutes at 50° C. The resulting solution was subsequently cooled to 23±2° C. prior to the viscosity measurement.
3. A sample of hyperbranched macromolecule solution was placed in the appropriate measurement geometry (Cone & Plate CP 5/30 or Cup & Spindle C14 geometry). The solution viscosity of the hyperbranched macromolecule was measured at a temperature of 50° C. for the 80% solids hyperbranched macromolecule solution, and at ambient temperature for the 70% solids hyperbranched macromolecule solution. A heating/cooling unit in the measurement geometry was used to control the temperatures.

Equilibrium Viscosity

The equilibrium viscosity measurements were performed with the plate & plate geometry, with a 15 mm (P15) top-plate and a 30 mm (P30) bottom-plate. The gap between the two plates was set to 1.0 mm. All compositions were used at the solids level at which they were prepared and not diluted to lower solids levels.

Step 1: Three test charts were provided with coatings of identical film thickness. The were applied with a 120 µm wire rod and the actual film thickness (and its uniformity) was checked with a wet film gauge, 20–370 µm, of Braive Instruments. The charts were dried under identical conditions in an environment where the airflow was <0.1 m/s.

Step 2: One test chart was used to determine the solids increase in time. The weight of the film was monitored in time, starting right after application of the film. After calculating the solids content at every measurement, a solids-time curve could be constructed and a trend line was calculated for the solids of the film as a function of the drying time.

Step 3: The other two test charts were used to determine the equilibrium viscosity in time: approximately every 5 minutes a sample was scraped from one test chart (in random order) and the viscosity of this sample was measured at 23° C. at representative shear rates of 0.0997 $s^{-1}$, 0.990 $s^{-1}$, 9.97 $s^{-1}$ and 78.6 $s^{-1}$. The measurements were continued for 90 minutes, unless reproducible sampling from the test charts could not be performed properly within that period of time (due to for example drying of the film to reach the dust free time).

Figure 2:
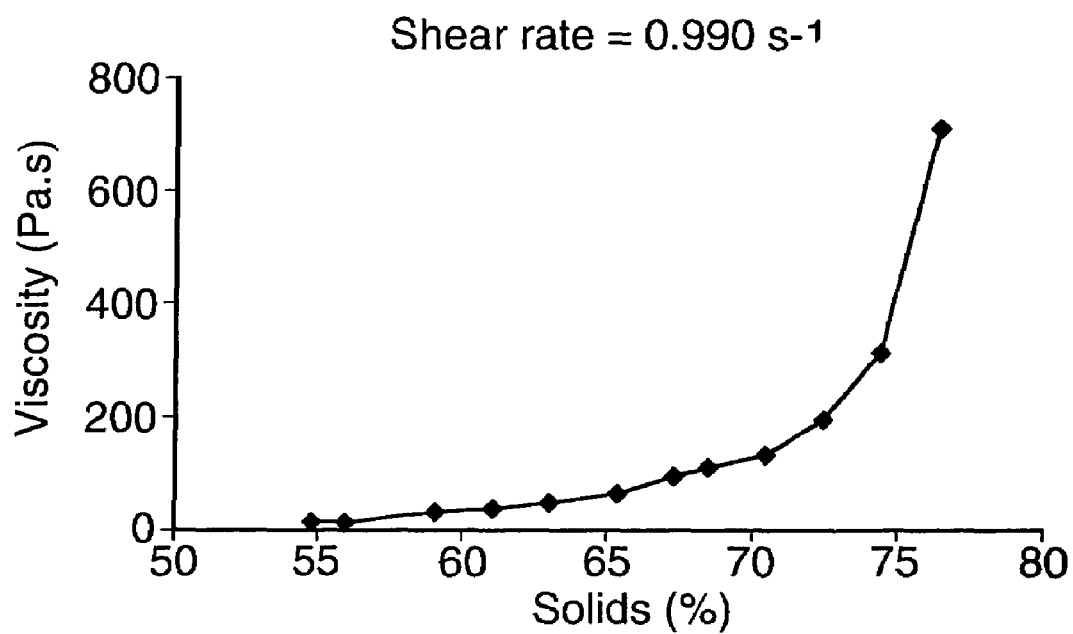
Figure 3:
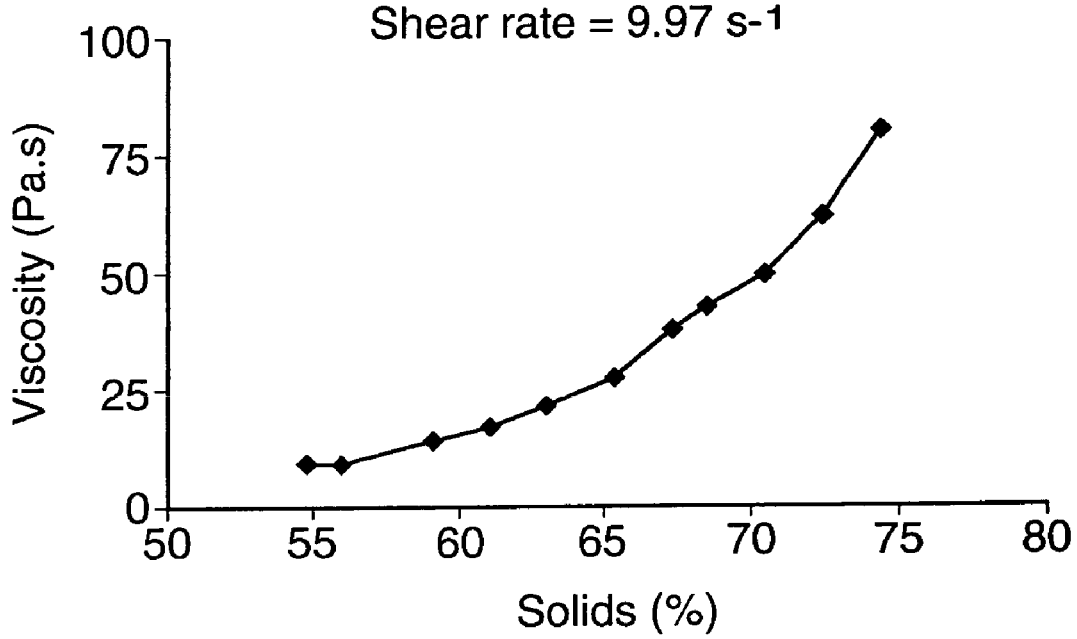
Figure 4:
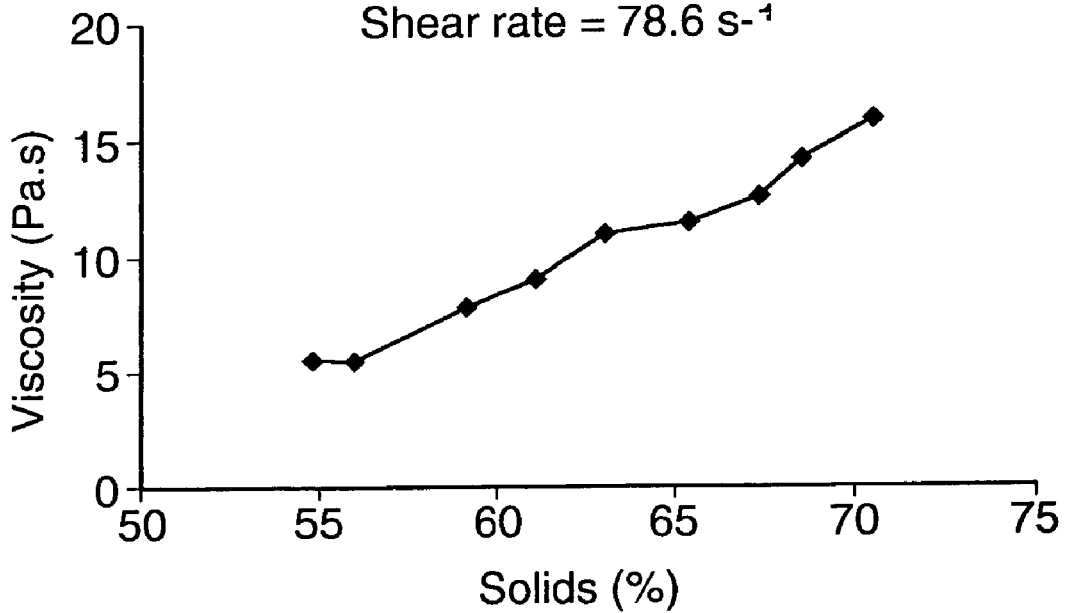

Step 4: The final drying curve of the coatings as shown in FIGS. 1 to 4 (in which the equilibrium viscosity is represented as a function of the solids of the drying film) could be constructed from the solids-time curve (Step 2) and the equilibrium viscosity data (Step 3). If the equilibrium viscosity at a shear rate of 9.97 $s^{-1}$ is lower than the equilibrium viscosity at a shear rate of 0.99 $s^{-1}$, which in turn is lower than the equilibrium viscosity at a shear rate of 0.0997 $s^{-1}$, the composition may be regarded as shear thinning. If this was the case the equilibrium viscosity at 78.6$^{-1}$ was not always measured as it would inherently always be lower than the equilibrium viscosity at a shear rate of 9.97 $s^{-1}$.

Measurement of Yellowing:

The yellowness of a fresh coating and the increased yellowing of a coating exposed to daylight or darkness for a specified time period was determined using a Tristimulus Colorimeter consisting of a data-station, a micro-colour meter, a calibration plate with a defined x, y and z value and a printer. The equipment was calibrated to the defined values of the calibration plate and then colour co-ordinates L, a and b, were measured. The colour co-ordinates define the brightness and colour on a colour scale, where 'a' is a measure of redness (+a) or greenness (−a) and 'b' is a measure of yellowness (+b) or blueness (−b), (the more yellow the coating, the higher the 'b' value). The co-ordinates 'a' and 'b' approach zero for neutral colours (white, grays and blacks). The higher the values for 'a' and 'b' are, the more saturated a colour is. The lightness 'L' is measured on a scale from 0 (white) to 100 (black).

The yellowing in daylight is defined as the increase of the yellowness (Δb day) of the coating during storage at 23±2° C. and in daylight for 28 days. The yellowing in darkness is defined as the increase in the yellowness (Δb dark) of the coating during storage at 23±2° C., in the dark for 14 days.

Molecular Weight Determination

Gel permeation chromatography (GPC) analyses for the determination of polymer molecular weights were performed on an Alliance Waters 2690 gPC with two consecutive PL-gel columns (type Mixed-C, I/d=300/7.5 mm) using tetrahydrofuran (THF) as the eluent at 1 cm$^3$/min and using an Alliance Waters 2410 refractive index detector. A set of polystyrene standards (analysed according to DIN 55672) was used to calibrate the GPC.

Samples corresponding to about 16 mg of solid material were dissolved in 8 cm$^3$ of THF, and the mixtures were stirred until the samples had dissolved. The samples were left undisturbed for at least 24 hours for complete "uncoiling" and subsequently were filtered (Gelman Acrodisc 13 or 25 mm ø CR PTFE; 0.45 µm) and placed on the auto-sampling unit of the GPC.

All species with a molecular weight less than 1000 Daltons are ignored when calculating the Mw and PDi for the oligomers. When Daltons are used in this application to give molecular weight data, it should be understood that this is not a true molecular weight, but a molecular weight measured against polystyrene standards as described above.

Centrifuge Test for the Determination of Water Solubility

A sample of for example a crosslinkable hyperbranched macromolecule was dispersed in water and diluted with water/ammonia to 10% solids and the pH adjusted to the desired pH, within a range of from 2 to 10, and the dispersion was then centrifuged over 5 hours at 21000 rpm at 23±2° C. on a Sigma 3K30 centrifuge (21,000 rpm corresponds to a centrifugal force of 40,000 g). The pH chosen should be the pH where the crosslinkable vinyl oligomer is expected to be most soluble, for example often a pH of about 9 is suitable for anionic stabilised dispersions and a pH of about 2 is often suitable for cationic stabilised dispersions. After centrifugation a sample of the supernatant liquid was taken and evaporated for 1 hour at 105° C. to determine the solids content of the supernatant liquid. The water solubility percentage was calculated by dividing the amounts of solids (in grams) of the supernatant by the total amount of solids put in the centrifuge tube and multiply this by 100.

Water Resistance:

The compositions prepared in the examples were cast down on Leneta test charts Form 2C with a film thickness of 120 µm. The films were dried at room temperature for 4 hours and at 50° C. for 16 hours. After they were cooled down to room temperature the films were tested for water resistance. A few drops of water were placed on the films and covered with a watch glass. The water was removed after 16 hours at room temperature and the damage to the coating was assessed immediately and after four hours recovery. 0 Means that the coating is dissolved, 5 means that the coating is not affected at all.

Detergent Resistance:

The compositions prepared in the examples were cast down on Leneta test charts Form 2C with a film thickness of 120 µm. The films were dried at room temperature for 4 hours and at 50° C. for 16 hours. After they were cooled down to room temperature the films were tested for detergent resistance. A few drops of detergent were placed on the films and covered with a watch glass. The detergent was removed after 16 hours at room temperature and the damage to the coating was assessed immediately and after four hours recovery. 0 Means that the coating dissolved, 5 means that the coating is not affected at all.

Materials & Abbreviations Used:

| | |
|---|---|
| DEA = | N,N-diethylethanolamine |
| Cardura E10 = | Neodecanoic acid-2,3-epoxypropyl ester available from Shell |
| MPEG750 = | methoxypolyethylene glycol (Mn approximately 750) |
| DMPA = | dimethylolpropionic acid |
| NMP = | N-methyl pyrrolidone |
| TDI = | toluene diisocyanate |
| Dowanol DPM = | dipropylene glycol monomethyl ether |
| DAPRO5005 = | drier salt available from Profiltra |
| 1,4-CHDM = | 1,4-cyclohexanedimethanol |
| Voranol P-400 = | polypropyleneglycol available from DOW Chemical |
| A1310 = | NCO functional silane component available from CK Witco Corporation |
| DMBA = | dibutylbutanoic acid |
| TMPME = | trimethylolpropanemonoallyl ether |
| TMPDE = | trimethylpropanediallylether |
| IPDI = | isophorone diisocyanate |
| TEA = | triethylamine |
| Combi LS = | drier salt available from Servo Delden |
| Boltorn H20 = | Dendritic polymer available from Perstorp |
| Nouracid LE80 = | linseed oil fatty acid available from AKZO Nobel |
| Fastcat 2005 = | tin(II)chloride available from Elf-Atochem |
| MEK = | methyl ethyl ketone |
| Atlas 4809 = | Alkyl phenol alkoxylate available from ATLAS Chemie |
| Atpol E5720/20 = | Fatty alcohol ethoxylate available from Uniqema |
| AP = | ammonium persulphate |
| Aerosol OT-75 = | Sodium dioctylsulphosuccinate available from Cytec |
| MMA = | methylmethacrylate |
| n-BA = | n-butylacrylate |
| AA = | acrylic acid |
| SLS = | Sodium Lauryl Sulphate |
| Akyposal NAF = | Sodium dodecylbenzenesulphonate available from KAO Chemicals |
| Natrosol 250LR = | Hydroxy ethyl cellulose available from Hercules |
| Akyporox OP-250V = | Octyl phenol ethoxylate available from KAO Chemicals |
| Surfactant = | Phosphate ester of nonyl phenol ethoxylate available from KAO Chemicals |
| VeoVa 10 = | Vinyl ester of versatic acid available from Shell |
| Desmodur W = | dicyclohexyl methane diisocyanate available from Bayer |
| Priplast 3192 = | Dimeric acid polyester polyol available from Uniqema |
| BMA = | n-butyl methacrylate |
| t-BHPO = | t-butyl hydroperoxide |
| Fe$^{III}$.EDTA = | ferric ethylene diamine tetracetic acid |
| IAA = | isoascorbic acid solution |
| STY = | Styrene |
| 2-EHA = | 2-Ethylhexylacrylate |
| Dynasilan MEMO = | 3-Methacryloxypropyltrimethoxysilane available from Degussa |
| HEMA = | Hydroxyethylmethacrylate |
| TEGDMA = | Triethyleneglycoldimethacrylate |
| OMKT = | n-octyl mercaptane |
| TAPEH = | tert-amylperoxy-2-ethyl hexanoate |
| Sliquest A.174NT = | γ-Methacryloxypropyltrimethoxysilane available from Witco |
| Water = | demineralised water |
| PW602 = | Transparent red iron-oxide pigment dispersion available from Johnson Matthey |
| IMCI = | 3(4)-isocyanatomethyl-3(4)-methyl-cyclohexyl isocyanate (mixture of isomers) |
| AMP-95 = | 2-amino-2-methyl-1-propanol from Intergrated Chemicals bv, 95% in water |
| Dehydran 1293 = | Defoamer additive available from Cognis, 10% in butyl glycol |
| Surfinol 104E = | Wetting agent available from Air Products, 50% in ethylene glycol |
| NeoCryl BT-24 = | Acrylic emulsion polymer available from Neo-Resins (Avecia bv) |

Preparation of a Poly-alkoxylated Adduct MPEG750/SAN

A 2-L 3-necked round bottom flask, equipped with stirrer, was loaded with methoxypolyethylene glycol (Mn ca. 750; 1323.53 g) and succinic anhydride (176.47 g) in a nitrogen atmosphere. The reaction mixture was heated to 120° C., and was stirred at this temperature until all the anhydride had reacted, as judged from the Infra Red spectrum of the reaction mixture (the anhydride groups typically show two absorptions at 1785 $cm^{-1}$ and 1865 $cm^{-1}$, which disappeared and were replaced by a new ester carbonyl absorption at 1740 $cm^{-1}$). The clear liquid product was then cooled to 50° C. and collected. The product solidified when left undisturbed at ambient temperature.

Crosslinkable Hyperbranched Macromolecule A1

A 2 liter, five-necked reactor flask fitted with a stirrer, a thermometer and a condenser fitted with a Dean-Stark condensate trap, was loaded with Boltorn H20 (Trademark from Perstorp AB; 150.00 g), the MPEG750/SAN adduct as prepared above (283.01 g), Nouracid LE80 (linseed oil fatty acid, Trademark from AKZO Nobel; 279.68 g) and Fastcat 2005 (stannous(II)chloride, Trademark from Elf-Atochem; 0.18 g) in a nitrogen atmosphere. The reaction mixture was heated to 230° C. and water was collected. The mixture was kept at 230° C. until an acid value of less than 10 mg KOH/g was obtained. The resultant hyper-branched polyester had a viscosity of 3.2 Pa·s, when measured at a shear rate of 91.9 $s^{-1}$, at 50° C. and at a solids content of 80% by weight in NMP, and a viscosity of 3.5 Pa·s, when measured at a shear rate of 91.9 $s^{-1}$, at 23° C. and at a solids content of 70% by weight in a solvent mixture of NMP/$H_2O$/DMEA=20/7/3.

The crosslinkable hyperbranched macromolecules A2 to A9 were prepared using the procedure for A1, using the components listed in Table 1 below, with the following changes:

Succinic anhydride (SAN) post-modification (A3 and A6) was performed by mixing the OH-functional hyper-branched polyester and SAN at 50° C., followed by heating the reaction mixture to 120° C. The mixture was stirred at this temperature until all the anhydride had reacted, as judged from the Infra Red spectrum of the reaction mixture (the anhydride groups typically show two absorptions at 1785 $cm^{-1}$ and 1865 $cm^{-1}$, which disappeared and were replaced by a new ester carbonyl absorption at 1740 $cm^{-1}$). N,N-dimethylamino pyridine (DMAP) was used as the catalyst and NMP can optionally be used as a co-solvent in this reaction.

3-Isocyanato-propyl triethoxy silane (IPTS), A1310 post-modification in A4 was performed by mixing the OH-functional hyper-branched polyester and IPTS at room temperature, followed by addition of a catalytic amount of dibutyltin dilaurate (DBTDL) and subsequent heating of the reaction mixture to 90° C. until all the isocyanate had reacted, as judged from the Infra Red spectrum of the reaction mixture (the NCO groups typically show an absorption at 2275 $cm^{-1}$). NMP was used as co-solvent in this reaction.

The hyperbranched polyester A5, with a combination of fatty acid and allyl functionality, was prepared by the post-reaction of an OH-functional hyper-branched polyester such as oligomer A7 with 3(4)-isocyanatomethyl-3(4)-methyl-cyclohexyl isocyanate (IMCI; mixture of isomers) at 50° C. and at an NCO/OH ratio of 2/1, followed by the reaction of the residual NCO groups with diallylamine at 50° C. and at an NCO/NH ratio of 0.98. Finally, a few drops of methanol were added to the mixture to remove traces of residual NCO functionality. NMP was used as co-solvent in this reaction.

Water Solubility

The hyperbranched macromolecules A6, A7 and A3 had a water solubility of 77%, 7.5% and 18% respectively as measured by the centrifuge test.

TABLE 1

| Components | A2 | A3 | A4 | A5 | A6 | A7 | A8 | A9 | A10 |
|---|---|---|---|---|---|---|---|---|---|
| Core (Boltorn Hxx) | H20 | H20 | H20 | H20 | H30 | H20 | H30 | (***) | H20 |
| Core (g) | 182.28 | 342.15 | 55.39 | 81.11 | 99.82 | 588.00 | 587.36 | 216.90 | 352.6 |
| SSBA (g) | — | — | 7.05 | — | — | — | — | — | — |
| Benzoic acid (g) | — | — | — | — | — | — | — | — | — |
| Levulinic acid (g) | — | 90.12 | — | — | — | — | 74.32 | — | — |
| Fatty acid | NA | — | — | NA | NA | NA | PF | NA | PF |
| Fatty acid (g) | 345.96 | — | — | 179.61 | 30.46 | 1302.00 | 718.08 | 196.52 | 617.1 |
| Lauric acid (g) | — | 349.78 | 53.41 | — | 59.92 | — | — | — | — |
| MPEG 750/SAN (g) | 351.33 | 97.96 | 38.02 | — | 27.74 | — | 477.73 | — | — |
| NMP (g) | — | — | 12.30 | — | — | — | — | — | — |
| $SnCl_2.H_2O$ (g) | 0.25 | — | — | 0.07 | — | 0.50 | — | — | — |
| Acid value (mg KOH/g) | 7.3 | 4.0 | 6.2 | 5.3 | 6.5 | 5.3 | 6.6 | 0.9 | 5.8 |
| Silquest A1310 (g) | — | — | 16.00 | — | — | — | — | — | — |
| IMCI (g) | — | — | — | 38.85 | — | — | — | — | — |
| Diallyl amine (g) | — | — | — | 21.28 | — | — | — | — | — |
| SAN (g) | — | 52.34 | — | — | 27.20 | — | 56.20 | 22.00 | — |
| DMAP (g) | — | 0.50 | — | — | 0.10 | — | 0.78 | 0.50 | — |
| DBTDL (g) | — | — | 0.02 | 0.02 | — | — | — | — | — |
| NMP (g) | — | 103.36 | 30.00 | 78.54 | 59.30 | — | — | 105.36 | — |
| Final acid value (mg KOH/g) | 7.3 | 44.4 | 5.1 | 3.4 | 57.8 | 5.3 | 25.4 | 24.2 | 5.8 |
| Solution viscosity * | 391 | 297 | 4880 | 183 | 3800 | 122 | 1620 | 1680 | 0.03 |
| Solution viscosity ** | 1650 | 1830 | 8310 | 642 | 12900 | 901 | 6900 | 11700 | 0.14 |
| Mw | 19683 | 9526 | 43994 | 7882 | 41147 | 9253 | 10897 | 8903 | 5822 |
| PDi | 6.21 | 2.49 | 18.98 | 4.16 | 7.91 | 2.12 | 2.81 | 2.61 | 1.60 |

\* 80% solids in NMP or BG at 91.9 $s^{-1}$ (mPa · s) and at 50° C.
\*\* 70% solids in NMP/$H_2O$/DMEA at 91.9 $s^{-1}$ (mPa · s) and at 23° C.
\*\*\* Product of 112.89 1,2-cyclohexane dicarboxylic anhydride and 116.57 g diisopropanolamine.
NA = NourAcid LE80
PF = PRIFAC 8961

Crosslinkable Hyperbranched Macromolecule Dispersion DA1

A portion of the hyperbranched polyester A1 (500.00 g) was heated to 70° C. and diluted with N-methyl-pyrrolidone (NMP; 113.50 g), dipropylene glycol monomethyl ether (DPM; 63.00 g). Finally, a drier salt (Dapro 5005 Trademark from Profiltra; 7.20 g) was added. The resultant solution was dispersed in water by the addition of hot water (50° C.; 1310.30 g) over a period of 10 minutes to the stirred solution of the hyperbranched oligomer. The resulting dispersion DA1 was stirred for an additional 30 minutes at 50° C. and subsequently cooled to ambient temperature and stored in a nitrogen atmosphere.

The dispersion DA1 had a solids content of 37.85%.

The crosslinkable hyperbranched macromolecule dispersions DA2 to DA10 were prepared according to similar procedures using the components listed in Table 2 below.

C. and diluted with dipropylene glycol monomethyl ether (51.38 g), N,N-dimethylethanolamine (DMEA; 10.27 g), DAPRO 5005 (5.84 g) and water (155.43 g). The mixture was homogenised at 55 to 60° C. and subsequently fed into water (907.1 g; 50° C.) in a separate reactor in a nitrogen atmosphere. The product dispersion was cooled to ambient temperature, filtered and stored in a nitrogen atmosphere. The dispersion DU1 has a solids content of 24.2%, acid value of 19.1 mgKOH/g, and on pH of 7.1.

The viscosity of an 80% solids solution of U1 in NMP (50° C., shear rate 91.1 s$^{-1}$) is 6.6 Pa·s.

The viscosity of a 70% solids solution of U1 in NMP/H$_2$O/DMEA (20/7/3) (23° C., shear rate 91.9 s$^{-1}$) is 10.9 Pa·s.

GPC analysis: Mw=4,917; Mn=2,535; PDi=1.94

TABLE 2

| Components | DA2 | DA3 | DA4 | DA5 | DA6 | DA7 | DA8 | DA9 | DA10 |
|---|---|---|---|---|---|---|---|---|---|
| MM | A2 | A3 | A4 | A5 | A6 | A7 | A8 | A9 | A10 |
| MM (g) | 250.00 | 50.00 | 43.60 | 75.00 | 50.00 | 40.00 | 300.00 | 80.00 | 300 |
| NMP | 62.50 | 6.25 | — | — | — | 10.00 | 75.00 | 20.00 | — |
| DPM | 31.25 | 6.61 | — | 7.50 | 5.00 | 5.00 | 37.50 | 10.00 | — |
| Drier salt | DAPRO 5005 | — | — | DAPRO 5005 | Durham VX74 | DAPRO 5005 | Borchersdry VP0133 | DAPRO 5005 | DAPRO 5005 |
| Drier salt (g) | 6.25 | — | — | 0.50 | 0.25 | 0.08 | 10.00 | 0.80 | 6 |
| Atlas G5000 | — | — | — | 3.00 | — | 2.10 | — | — | 16.15 |
| Neut. A | DMEA | NH$_3$ | — | — | Et$_3$N | — | NH$_3$ | DMEA | — |
| Neut. A (g) | 0.97 | 2.91 | — | — | 5.22 | — | 11.30 | 3.45 | — |
| Water (g) | 312.57 | 88.41 | 95.92 | 40.13 | 57.96 | 27.02 | 437.73 | 151.58 | 312 |
| Additive | — | ADH | — | — | — | Combi LS | ADH | — | — |
| Additive (g) | — | 2.77 | — | — | — | 0.74 | 4.96 | — | — |
| Solids (%) | 37.87 | 29.97 | 24.89 | 50.12 | 36.21 | 50.43 | 30.33 | 31.22 | 50 |
| pH | 7.0 | 8.0 | 7.5 | 7.4 | 7.4 | 4.8 | 7.8 | 8.1 | 5.1 |

MM = macromolecule
Neut. A = Neutralising agent
NH$_3$ used as (25% aq)

Preparation of a Crosslinkable Urethane Oligomer U1, and its Dispersion DU1

The first step of this preparation provides an isocyanate-reactive material bearing crosslinker groups for use in the synthesis of the self-crosslinkable polyurethane oligomer, the isocyanate-reactive groups being hydroxyl and the crosslinker groups being fatty acid groups. A 1-L 3-necked round bottom flask, equipped with a stirrer and a thermometer, was loaded with N,N-diethanolamine (DEA) (100.00 g), NaOMe (0.52 g) and sunflower oil (505.10 g) in a nitrogen atmosphere. The hazy reaction mixture was stirred at 110–120° C. until a clear mixture was obtained. Stirring at the given temperature was continued until a DEA-conversion of at least 90% was achieved, as determined by titration of residual amine functionality in the product with 1 N aqueous HCl. A conversion of 94% was achieved. The product was then cooled to room temperature and stored under nitrogen.

In the second step, a 1-L 3-necked round bottom flask, equipped with a stirrer and a thermometer, was loaded with dimethylolpropanoic acid (DMPA; 19.36 g), N-methyl pyrrolidone (NMP; 92.50 g), methoxypolyethylene glycol (MPEG750; 18.87 g), cyclohexane dimethanol (CHDM; 8.97 g), the alkyd polyol mixture described above (260.43 g) and toluene diisocyanate (TDI; 99.89 g). The reactor was purged with nitrogen and the reaction mixture was slowly heated to 50° C. and stirred at this temperature for 1 hour in a nitrogen atmosphere. The mixture was then heated to 80° C. and kept at this temperature for 1 hour. The resultant NCO-free alkyd urethane oligomer H was then cooled to 70°

Preparation of a Non-crosslinkable Urethane Oligomer U2, and its Dispersion DU2

In a nitrogen atmosphere, a 1-L 3-necked round bottom flask, equipped with a stirrer and a thermometer, was loaded with dimethylolpropanoic acid (DMPA; 48.00 g), N-methyl pyrrolidone (NMP; 240.00 g), methoxypolyethylene glycol (MPEG750; 19.20 g) and polypropylene glycol (Voranol P400, trademark from Dow Europe; 618.64 g). At 50° C., toluene diisocyanate (TDI; 274.16 g) was fed into this polyol mixture while the contents of the reactor were stirred. After the TDI feed was complete, the reaction mixture was heated to 80° C. and stirred at this temperature for 1 hour. The resultant NCO-free urethane oligomer U2 was then cooled to 70° C.

A portion of this urethane oligomer (949.80 g) was diluted with dipropylene glycol monomethyl ether (97.60 g) and N,N-dimethylethanolamine (DMEA; 25.51 g) at 60° C. and the resulting mixture was stirred for 15 min at this temperature. Then hot water was added (50° C.; 295.25 g) and the resulting predispersion was stirred for an additional 15 min at 55 to 60° C. A portion of 1100.00 g of this mixture was subsequently fed into water (919.97 g; 50° C.) in a separate reactor over a period of 60 minutes in a nitrogen atmosphere. After complete addition, the final dispersion was stirred for an additional 15 minutes at 45–50° C., then cooled to ambient temperature, filtered and stored under nitrogen. The dispersion DU2 has a solids content of 24.2%.

The viscosity of an 80% solids solution of U2 in NMP (50° C., shear rate 91.1 s$^{-1}$) is 57 Pa·s.

The viscosity of a 70% solids solution of U2 in NMP/H$_2$O/DMEA (20/7/3) (23° C., shear rate 91.9 s$^{-1}$) is 36.7 Pa·s.

GPC analysis of U2: Mw=10,251; Mn=4,476; PDi=2.29

Preparation of Dispersed Vinyl Polymer P1

A 2-L 3-necked round bottom glass reactor, equipped with stirrer, thermometer and vortex breakers was loaded with demineralised water (652.57 g), Atpol E5720/20 (4.99 g) and Borax.10H2O (3.57 g) in a nitrogen atmosphere. The mixture was heated whilst stirring to 80° C. and then a solution of AP (2.31 g) in demineralised water (16.00 g) was added. In a dropping funnel a pre-emulsion was prepared by stirring a mixture of demineralised water (161.87 g), Atpol E5720/20 (94.85 g), Aerosol OT-75 (7.20 g), Borax.10H2O (1.07 g), MMA (534.18 g), n-BA (444.32 g) and AA (19.97 g). 5% of this pre-emulsion was added to the reactor at 80° C. over 5 minutes. The remainder was fed into the reactor over 160 minutes at 85° C. A solution of AP (0.53 g) in demineralised water (7.88 g) was added to the reactor during the first 15 minutes of feeding the pre-emulsified feed. Then the reactor content was kept at 85° C. for 30 minutes, and then cooled to ambient temperature. The pH was adjusted to 8 to 8.5 with 12.5% aqueous ammonia. The resultant product (P1) was filtered and collected.

The properties of P1 are listed in Table 5.

Preparation of a Sequential Dispersed Vinyl Polymer P2

A 2-L 3-necked round bottom glass reactor, equipped with stirrer, thermometer and vortex breakers, was loaded with demineralised water (990.94 g), SLS (30%, 0.55 g) and NaHCO$_3$, (4.44 g) in a nitrogen atmosphere. The mixture was heated whilst stirring to 80° C. and then a solution of AP (0.89 g) in demineralised water (5.00 g) was added. In a dropping funnel a monomer mixture was prepared by stirring MMA (140.48 g), n-BA (207.71 g) and AA (7.11 g). 10% of this mixture was added to the reactor at 80° C. The remainder was fed into the reactor over a period of 40 minutes at 85° C. The content of a separate dropping funnel, containing demineralised water (20.00 g), AP (0.36 g) and SLS 30% (11.62 g) was added in the same time. The reactor content was kept at 85° C. for 30 minutes. A second monomer mixture was prepared in a dropping funnel consisting MMA (464.91 g), n-BA (57.37 g) and AA (10.66 g). The mixture was fed to the reactor after the 30 minutes period in 60 minutes. The content of a separate dropping funnel, containing demineralised water (30.00 g), AP (0.53 g) and SLS 30% (17.44 g) was added in the same time. The reactor content was kept at 85° C. for 45 minutes and then cooled to ambient temperature. The pH was adjusted to 8 to 8.5 with 12.5% aqueous ammonia. The resultant product P2 was filtered and collected.

The properties of P2 are listed in Table 5.

Preparation of Dispersed Vinyl Polymer P3

A 2-L 3-necked round bottom glass reactor, equipped with stirrer, thermometer and vortex breakers, was loaded with demineralised water (194.50 g), Akyposal NAF (3.00 g), Borax.10H2O (1.25 g), Acetic acid (0.50 g) and Natrosol 250LR (10.00 g) in a nitrogen atmosphere. The mixture was heated whilst stirring to 60° C. and then a solution of AP (0.50 g) in demineralised water (10.00 g) was added. In a dropping funnel a pre-emulsion was prepared by stirring with demineralised water (171.71 g), Akyposal NAF (3.00), Borax.10H2O (1.25 g), Acetic acid (0.50 g) and Akyporox OP-250V (14.29 g) followed by VeoVa 10 (125.00 g) and vinyl acetate (375.00 g). 10% of this mixture was added to the reactor at 60° C. The mixture was heated whilst stirring to 80° C. The remainder was fed into the reactor over 90 minutes at 80° C. The content of a separate dropping funnel, containing a solution of AP (1.15 g) in demineralised water (60.00 g), was added in the same time. Then the reactor content was kept at this temperature for 120 minutes and then cooled to ambient temperature. The pH was adjusted to 8 to 8.5 with 12.5% aqueous ammonia. The resultant product P3 was filtered and collected.

The properties of P3 are listed in Table 5.

Preparation of the Dispersed Urethane Acrylic Polymer P4

Stage 1: A 1-L 3-necked round bottom flask, equipped with a stirrer and a thermometer, was loaded with NMP (100.00 g), DMPA (24.00 g), Desmodur W (152.68 g) and Priplast 3192 (223.33 g) in a nitrogen atmosphere. The reaction mixture was heated to 55° C., tin octoate (0.05) was added and the temperature was raised to 90–95° C. The mixture was kept at this temperature for 1 hour before adding tinoctoate (0.05) and the mixture was kept at 90° C. for an additional hour. The NCO-concentration of the mixture was found to be 4.83%. The resulting NCO terminated urethane prepolymer (500.05 g) (from which samples of a total weight of 10.0 g were taken for % NCO determination leaving 490.05 g of prepolymer) was then cooled to 70° C., neutralised with TEA (17.75 g) diluted with BMA (196.02 g) and homogenised for 15 minutes at 65° C.

Stage 2: A 2-L 3-necked round bottom flask, equipped with a stirrer and thermometer, was loaded with a water phase consisting of water (1045.77 g) and BMA (174.00 g) in a nitrogen atmosphere. A portion of the urethane prepolymer (625.00 g) prepared in Stage 1 (at 60–65° C.) was fed into the reactor over 1 hour, keeping the temperature of the reactor contents below 30° C. After the feed was complete, the mixture was stirred for an additional 5 minutes before chain-extension by the addition of an aqueous 64.45% hydrazine hydrate solution (N$_2$H$_4$.H$_2$O, 11.43 g in 25.00 g H$_2$O). A reactor temperature of 36° C. was reached. Subsequently, a 5% aqueous initiator solution of t-BHPO (18.10 g) and a 1% aqueous solution of Fe$^{III}$.EDTA; 4.63 g) was added to the reaction mixture. The radical polymerisation was started by the addition of a 1% aqueous iAA (45.24 g) and the reaction temperature was allowed to reach 56° C. before more aqueous iAA (45.24 g) was added. The reaction mixture was homogenised for 15 minutes, then cooled to room temperature, filtered over a 200-mesh sieve and collected. The properties of P4 are listed in Table 5.

Preparation of Dispersed Vinyl Polymer P5

A 2-L 3-necked round bottom glass reactor, equipped with stirrer, thermometer and baffles, was loaded with demineralised water (990.94 g), SLS 30% (0.55 g) and NaHCO$_3$ (4.44 g) in a nitrogen atmosphere. The mixture was heated whilst stirring to 80° C. and then a solution of AP (0.89 g) in demineralised water (5.00 g) was added. STY (468.54 g), 2-EHA (361.69 g) and AA (58.00 g) were mixed in a dropping funnel. 10% of this mixture was added to the reactor at 80° C. and remainder was fed into the reactor over 100 minutes at 85° C. The content of a separate dropping funnel, containing demineralised water (50.00 g), AP (0.89 g) and SLS 30% (29.06 g) was added in the same time and the reactor content was kept at 85° C. for 45 minutes and then cooled to 60° C. At 60° C. a burn-up was applied by adding a solution of iAA (2.60 g) in demineralised water (49.00 g) to the reactor followed by a mixture of t-BHPO (80%, 2.40 g) and demineralised water (18.00 g). After 60 minutes the reactor content was cooled to ambient temperature. The pH was adjusted to 8 to 8.5 with 12.5% aqueous ammonia. The product P5 was filtered and collected. The properties of P5 are listed in Table 5.

Preparation of Dispersed Polymers P6 to P11 and P13

The dispersed polymers P6 to P11 and P13 were prepared using the method described for P5 with the variations as listed in Table 4. The properties of P6 to P11 and P13 are listed in Table 5. The Mn's and Mw's of P1 to P12 and P13 could not be measured.

TABLE 3

| Components (g) | P6 | P7 | P8 | P9 | P10 | P11 | P13 |
|---|---|---|---|---|---|---|---|
| Reactor phase | | | | | | | |
| water | 912.19 | 960.66 | 990.94 | 1001.24 | 960.66 | 990.94 | 952.57 |
| SLS 30% | — | 72.94 | 0.55 | — | 72.94 | 0.55 | — |
| Surfactant | 0.83 | — | — | — | — | — | 0.92 |
| NaHCO$_3$ | 4.12 | 4.38 | 4.44 | 4.46 | 4.38 | 4.44 | 4.57 |
| Shot at 80° C. | | | | | | | |
| AP | 0.83 | 0.88 | 0.89 | 0.89 | 0.88 | 0.89 | 0.92 |
| water | 5.00 | 5.00 | 5.00 | 5.00 | 5.00 | 5.00 | 5.52 |
| Monomer mixture | | | | | | | |
| STY | — | — | — | — | — | 399.70 | — |
| MMA | 577.36 | 332.60 | 617.32 | 352.94 | 759.26 | 124.35 | 611.55 |
| BA | 236.86 | 402.63 | 253.15 | 521.85 | 89.76 | 133.24 | 239.02 |
| BMA | — | — | — | — | — | 204.29 | — |
| AA | 16.62 | — | 17.77 | 17.85 | 17.51 | 17.77 | 18.29 |
| MAA | — | 87.53 | — | — | — | — | — |
| Dynasilan MEMO | 41.54 | — | — | — | — | — | — |
| HEMA | — | 52.52 | — | — | — | — | — |
| TEGDMA | — | — | — | — | 8.75 | — | — |
| IOTG | — | — | — | — | — | — | — |
| AAEM | — | — | — | — | — | — | 45.73 |
| Separate feed | | | | | | | |
| water | 50.00 | 50.00 | 50.00 | 50.00 | 50.00 | 50.00 | 52.50 |
| AP | 0.83 | 0.88 | 0.89 | 0.89 | 0.88 | 0.89 | 0.92 |
| SLS 30% | — | — | 29.06 | 14.88 | — | 29.06 | — |
| Surfactant | 123.79 | — | — | — | — | — | 136.72 |

P11 only = Burn-up at 60° C. with IAA (0.889) water (12 g) tBHPO (0.88 g) and water (26.7 g)

Preparation of a Fatty Acid Functional Dispersed Polymer P12

In a 1 L 3-necked round bottom reactor, equipped with stirrer and N$_2$ inlet, Nouracid LE80 (398.8 g), GMA (201.2 g), Irganox 1010 (0.10 g), Phenothiazine (0.10 g) and benzyl trimethylammonium hydroxide (40 wt % in water; 1.05 g) were loaded. The reactor was purged with nitrogen and the yellow reaction mixture was heated and stirred at 155° C. until the acid value had dropped to 3.7 mg KOH/g. After cooling to ambient temperature, the product was collected and stored under nitrogen.

A portion of 161.3 gram of this adduct was mixed with MAA (40.3 g) and transferred into a dropping funnel. This mixture was slowly added over a period of one hour to a 1 L 3-necked round bottom reactor containing a solution of lauroyl peroxide (21.4 g) in butyl glycol (273.0 g) at 125° C. in a nitrogen atmosphere. After complete addition, the resulting copolymer solution was cooled to 50° C. and subsequently concentrated in vacuo to 80% solids using a rotary evaporator. To the resulting yellow solution, a mixture of water (580.0 g), aqueous ammonia (25%; 12.0 g) and SLS (4.4 g) was added at 70° C. A mixture of MMA (225.5 g) and BA (92.5 g) was added to the resulting dispersion and the reaction mixture was stirred for 30 minutes at 70° C. The reaction mixture was heated to 85° C. and a solution of ammonium persulphate (0.86 g) in water (20.0 g) was added over a period of 10 min. The mixture was stirred at 85° C. for 3 h. Then a second portion of ammonium persulphate (0.86 g) in water (20.0 g) was added and the mixture was stirred at 85° C. for 30 minutes. Then a third portion of ammonium persulphate (0.86 g) in water (20.0 g) was added and the mixture was stirred for an additional 30 minutes at 85° C. The resulting dispersion was cooled to ambient temperature, filtered and stored under nitrogen. The dispersion had a solids content of 39.3%, a pH of 7.7 and contained 2.59% butyl glycol on total dispersion.

TABLE 4

| Parameter | P1 | P2 | P3 | P4 | P5 | P6 | P7 | P8 | P9 | P10 | P11 | P12 | P13 |
|---|---|---|---|---|---|---|---|---|---|---|---|---|---|
| Solids [wt %] | 51.2 | 45.1 | 50.3 | 35.2 | 42.4 | 44.6 | 21.4 | 45.0 | 45.0 | 44.6 | 44.3 | 39.3 | 44.5 |
| pH | 8.3 | 8.3 | 8.2 | 7.9 | 8.3 | 8.2 | 8.0 | 8.2 | 8.2 | 8.3 | 8.2 | 7.7 | 8.4 |
| Particle size [nm] | 450 | 230 | 330 | 65 | 255 | 390 | 69 | 307 | 590 | 67 | 230 | — | 406 |
| Measured Tg* [° C.] | 25 | 2 | 24 | 43 | 27 | 58 | 40 | 57 | 2 | 96 | 54 | 49 | 51 |
| Acid value** | 15.6 | 15.6 | 0 | 12.4 | 50.6 | 15.6 | 63.4 | 15.6 | 15.6 | 15.6 | 15.6 | — | 15.6 |

*with DSC (midpoint)
**Theoretical on solids (mgKOH/g)

Preparation of Blends of the Dispersed Hyperbranched Macromolecules, Dispersed Oligomers and Dispersed Polymers Prepared Above:

Preparation of a Blend of Dispersion DA1 and Vinyl Polymer P1=A1P1

In a nitrogen atmosphere, a 1-L 3-necked round bottom flask, equipped with a stirrer, was loaded with water (181.79 g), dispersion DA1 (175.00 g) and the vinyl polymer latex P1 (226.85 g). The mixture was stirred for 30 minutes at ambient temperature, filtered and then stored under nitrogen. The resultant dispersion AP1 had a solids content of 25.0% by weight.

A range of blends were prepared according to similar procedures using the components listed in Table 5 below except that for blend A3P5 NMP (7.8 g) was added, for blend A5P7 DPM (10.69 g) was added and for blend A6P8 Durham VX74 (0.12 g) was added.

GmbH;) was added until a suitable viscosity was obtained (4,000 to 6,000 mPa·s). The paint formulation was left undisturbed for 24 h, then is stirred up to mix the contents intimately, checked (and when necessary corrected) for its viscosity, and finally tested on drying and other properties.

Pigment paste C830 comprised a paste of $TiO_2$ (24.0 g), propylene glycol (1.4 g), water (3.3 g), AMP-95, Dehydran 1293 (0.5), Surfinol 104 E (0.4 g) and NeoCryl BT-24 3.1 g).

Paint examples 2 to 16 were prepared according to similar procedures using the components presented in Table 6. The

TABLE 5

| Components | DA1 | A2P1 | A2P2 | A2P3 | A2P4 | A3P5 | A4P6 | A5P7 |
|---|---|---|---|---|---|---|---|---|
| Macromolecule | DA1 | DA2 | DA2 | DA2 | DA2 | DA3 | DA4 | DA5 |
| Macromolecule (g) | 500.00 | 175.00 | 50.00 | 90.00 | 80.00 | 100.00 | 57.39 | 30.00 |
| Macromolecule (%) | 100 | 35 | 50 | 50 | 50 | 70 | 40 | 50 |
| Polymer | — | P1 | P2 | P3 | P4 | P5 | P6 | P7 |
| Polymer (g) | — | 226.85 | 41.96 | 67.72 | 86.03 | 30.32 | 48.25 | 70.09 |
| Polymer (%) | — | 65 | 50 | 50 | 50 | 30 | 60 | 50 |
| Water | — | 181.79 | — | — | — | — | — | 3.00 |
| Dispersion solids (%) | 25.00 | 25.00 | 41.66 | 44.12 | 36.84 | 31.82 | 30.16 | 27.14 |
| pH | 6.2 | 7.5 | 7.2 | 6.7 | 7.4 | 8.2 | 7.5 | 8.0 |

| Components | A6P8 | A7P9 | A3U1P10 | A2A4U2P11 | A8P12 | A9P13 | A10P11 |
|---|---|---|---|---|---|---|---|
| Macromolecule | DA6 | DA7 | DA3/U1 | DA2/DA4/U2 | DA8 | DA9 | DA10 |
| Macromolecule (g) | 57.55 | 20.00 | 13.43/66.57 | 8.7,/6.56 | 86.46 | 60.00 | 450 |
| Macromolecule (%) | 45 | 15 | 8, 32 | 8.8, 4.4 | 50 | 40 | 50 |
| Polymer | P8 | P9 | P10 | P11 | P12 | P13 | P11 |
| Polymer (g) | 52.36 | 125.93 | 62.61 | 55.34 | 66.00 | 60.67 | 507.9 |
| Polymer (%) | 55 | 85 | 60 | 66.7 | 50 | 60 | 50 |
| Water | — | — | — | 0.00 | — | 0.00 | — |
| Dispersion solids (%) | 40.46 | 46.33 | 32.63 | 42.36 | 29.91 | 33.69 | 46.98 |
| pH | 7.6 | 8.0 | 7.1 | 7.8 | 7.0 | 7.7 | 7.2 |

EXAMPLE 1

Pigmented Paint Composition Comprising Dispersion DA2

A 1-L 3-necked round bottom flask, equipped with a stirrer, was loaded with dispersion DB (200.0 g) and $TiO_2$-based pigment paste C830 (66.7 g; solids content of 74.9%) in a nitrogen atmosphere, and the mixture was stirred for 30 minutes at ambient temperature. The resulting paint formulation had a solids content of 36.8%. Then a wetting agent (Byk344, 0.1 g, trademark from Byk-Chemie) and a urethane thickener (Borchigel L75N, Trademark from Borchers drying and other-properties of these examples are also presented in Table 6 except that for example 8a defoamer (Agitan 218, 0.1 g) was added and for example 15 PW602 was used instead of C830.

Sandability and Resistance Results

The water resistance level for examples 1, 2, 3, 5, 8, 9 and 10 before recovery was 5 and after recovery it was also 5.

The detergent resistance level for examples 8 and 10 before recovery was 5 and after recovery was also 5.

The sandability for example 7 was 18 hours, for example 8, 32 hours, for example 9, 20 hours, for example 11, 6.9 hours and for example 16 was 20 hours.

TABLE 6

| Example | 1 | 2 | 3 | 4 | 5 | 6 |
|---|---|---|---|---|---|---|
| Blend | DA1 | A2P1 | A2P2 | A2P3 | A2P4 | A3P5 |
| Blend (g) | 200.00 | 99.14 | 107.14 | 117.72 | 124.03 | 90.32 |
| Pigment paste C830 (g) | 66.67 | 53.11 | 54.29 | 62.6 | 56.59 | 36.56 |
| Open Time (mins) | 65 | 48 | 58 | 40 | 42 | 42 |
| Wet edge time (mins) | 45 | 33 | 19 | 13 | 16 | 14 |
| Dust-free time (mins) | 60 | 60 | 45 | 45 | 40 | 40 |
| Tack-free time (hours) | 8 | 6 | 5.25 | 5.25 | 5.25 | 1.5 |
| Thumb-hard time (hours) | 8 | 8 | 6.5 | 7 | 5.25 | 7.5 |
| Yellowness at start | 4.21 | 3.81 | 3.82 | 3.87 | 3.62 | 2.67 |
| Yellowing (Δb day) | 1.03 | 3.11 | 2.22 | 1.8 | 1.64 | 0.46 |
| Yellowing (Δb dark) | 0.64 | 0.11 | −0.15 | 0.04 | 0.24 | 0.57 |

| Example | 7 | 8 | 9 | 10 | 11 | 12 |
|---|---|---|---|---|---|---|
| Blend Code | A4P6 | A5P7 | A6P8 | A7P9 | A3U1P10 | A2A4U2P11 |
| Blend (g) | 105.64 | 103.09 | 110.03 | 105.93 | 102.61 | 65.4 |
| Pigment paste C830 (g) | 44.15 | 46.2 | 53.8 | 59.57 | 41.22 | 50.30 |

TABLE 6-continued

| | | | | | | |
|---|---|---|---|---|---|---|
| Open Time (minutes) | 55 | 37 | 40 | 42 | 58 | 38 |
| Wet edge time (minutes) | 30 | 15 | 15 | 13 | 27 | 16 |
| Dust-free time (minutes) | 35 | 70 | 10 | 18 | 35 | 70 |
| Tack-free time (hours) | 1 | 3 | 1 | 2.33 | 2 | 1.2 |
| Thumb-hard time (hours) | 4.5 | 4.5 | 6 | 7 | 2 | 1.2 |
| Yellowness at start | 2.6 | 3.26 | 3.54 | 3.15 | 3.9 | 3.09 |
| Yellowing ($\Delta$b dark) | 0.46 | 3.71 | 1.47 | 1.95 | 2.11 | 1.37 |
| Yellowing ($\Delta$b day) | −0.11 | 1.04 | −0.1 | 0.55 | 0.45 | 0.29 |

| Components (g) | 13 | 14 | 15 | 16 | C17 | C18 |
|---|---|---|---|---|---|---|
| Blend Code | A8P12 | A9P14 | A2P2 | A10P11 | P5 | P7 |
| Binder dispersion amount | 148.96 | 120.67 | 85.00 | 4.25 | 100 | 100 |
| Pigment paste C380 (g) | 63.86 | 55.4 | PW602, 2.55 g | — | — | — |
| Open Time (mins) | 53 | 44 | 42 | 50 | 35 | 45 |
| Wet edge time (mins) | 20 | 34 | 28 | 15 | 7 | 8 |
| Dust-free time (mins) | 30 | 26 | 45 | 18 | 15 | 30 |
| Tack-free time (hours) | 8.5 | 3 | 3 | 1.5 | 1.5 | 0.5 |
| Thumb-hard time (hours) | 8.5 | 9 | 3.5 | 6.5 | 2 | 1 |
| Yellowness at start | 2.38 | 5.27 | — | 5.74 | — | — |
| Yellowing ($\Delta$b dark) | 0.96 | 3.75 | — | — | — | — |
| Yellowing ($\Delta$b day) | 2.67 | 0.94 | — | — | — | — |

Equilibrium Viscosities of the Examples Prepared Above are Given in Tables 7 to 24 Below:

TABLE 7

Example 1

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.0 | 53.5 | 69.6 | 18.9 | 7.2 | 4.6 |
| 8.0 | 55.9 | 83.3 | 22.0 | 8.5 | — |
| 20.0 | 61.1 | 127.0 | 31.7 | 13.1 | 9.1 |
| 28.0 | 64.4 | 70.7 | 29.2 | 17.7 | 13.5 |
| 41.5 | 69.7 | 504.0 | 73.0 | 20.1 | 11.0 |
| 49.0 | 72.2 | 467.0 | 61.4 | 15.6 | 7.7 |
| 60.0 | 75.3 | 581.0 | 72.0 | 16.7 | 7.8 |
| 74.0 | 78.3 | 725.0 | 74.4 | 15.4 | — |
| 91.0 | 80.5 | 989.0 | 105.0 | 21.1 | — |
| 105.0 | 81.5 | 1190.0 | 118.0 | 23.2 | 10.0 |

TABLE 8

Example 2

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) |
|---|---|---|---|---|
| 2.5 | 55.5 | 228.0 | 31.6 | 10.1 |
| 12.0 | 60.8 | 303.0 | 57.1 | 18.3 |
| 19.5 | 64.7 | 597.0 | 117.0 | 40.1 |
| 23.5 | 66.7 | 1110.0 | 237.0 | 100.0 |
| 31.5 | 70.6 | 2180.0 | 458.0 | 106.0 |
| 35.0 | 72.2 | 3300.0 | 644.0 | 130.0 |
| 41.0 | 74.9 | 10800.0 | 1630.0 | — |
| 44.0 | 76.1 | 25200.0 | — | — |

TABLE 9

Example 3

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.00 | 52.80 | 102.00 | 18.40 | 5.23 | 2.01 |
| 7.00 | 55.15 | 144.00 | 24.70 | 6.76 | 3.49 |
| 14.00 | 58.36 | 242.00 | 40.40 | 10.20 | 5.76 |
| 19.00 | 60.60 | 276.00 | 56.80 | 16.10 | 8.65 |
| 25.00 | 63.23 | 690.00 | 125.00 | 39.30 | — |
| 31.00 | 65.79 | 1250.00 | 233.00 | 75.20 | — |
| 36.00 | 67.88 | 1670.00 | 278.00 | — | — |
| 41.00 | 69.92 | 6800.00 | 850.00 | — | — |
| 45.00 | 71.52 | 14300.00 | 1690.00 | — | — |
| 55.00 | 75.40 | 41300.00 | 9800.00 | — | — |

TABLE 10

Example 4

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 4.0 | 55.0 | 131.0 | 19.4 | 7.5 | 4.5 |
| 6.0 | 55.8 | 101.0 | 21.3 | 8.2 | 5.0 |
| 14.0 | 58.8 | 145.0 | 32.2 | 10.7 | 6.1 |
| 19.0 | 60.5 | 217.0 | 32.8 | 10.8 | 6.0 |
| 24.0 | 62.3 | 280.0 | 42.6 | 15.3 | 8.3 |
| 29.5 | 64.1 | 352.0 | 57.4 | 18.7 | 9.7 |
| 35.0 | 65.9 | 582.0 | 94.9 | 28.3 | 10.8 |
| 40.0 | 67.5 | 4540.0 | 1240.0 | 116.0 | — |
| 42.0 | 68.1 | 6630.0 | 1590.0 | 148.0 | 45.5 |
| 47.0 | 69.6 | 8360.0 | 2550.0 | 245.0 | — |
| 52.0 | 71.1 | 8000.0 | 3800.0 | 355.0 | — |
| 58.0 | 72.7 | 14600.0 | — | — | — |

TABLE 11

Example 5

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 3.0  | 49.2 | 236.0   | 28.3   | 10.8  | 6.7  |
| 3.0  | 49.2 | —       | 38.8   | 12.3  | —    |
| 12.0 | 53.3 | 326.0   | 43.7   | 15.6  | 7.6  |
| 19.0 | 56.5 | 978.0   | 183.0  | 49.6  | —    |
| 24.0 | 58.8 | 1240.0  | 169.0  | 50.0  | 22.6 |
| 31.0 | 62.0 | 4170.0  | 884.0  | 158.0 | —    |
| 36.0 | 64.2 | 5000.0  | 1170.0 | 287.0 | —    |
| 42.0 | 67.0 | 16400.0 | 5730.0 | —     | —    |
| 45.5 | 68.6 | 30500.0 | —      | —     | —    |

TABLE 12

Example 6

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 2  | 42.18 | 54.10   | 16.60   | 5.45   | 1.97  |
| 7  | 43.65 | 71.80   | 23.50   | 7.15   | 2.44  |
| 12 | 45.12 | 101.00  | 31.50   | 8.16   | 2.74  |
| 18 | 46.89 | 130.00  | 43.80   | 10.80  | 3.39  |
| 23 | 48.36 | 332.00  | 82.40   | 17.00  | 4.26  |
| 28 | 49.83 | 496.00  | 125.00  | 24.00  | 5.36  |
| 33 | 51.30 | 1040.00 | 205.00  | 35.80  | 6.78  |
| 38 | 52.77 | 1400.00 | 249.00  | 41.70  | 7.43  |
| 43 | 54.24 | 3400.00 | 541.00  | 74.70  | 11.40 |
| 48 | 55.71 | 5410.00 | 1050.00 | 138.00 | —     |
| 53 | 57.18 | 8040.00 | —       | —      | —     |

TABLE 13

Example 7

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 3.0  | 47.1 | 149.0   | 38.4   | 15.2  | —    |
| 8.0  | 49.6 | —       | 36.8   | 17.2  | 5.9  |
| 15.0 | 53.0 | 394.0   | 127.0  | 42.8  | 14.7 |
| 20.0 | 55.5 | 336.0   | 97.1   | 38.9  | 12.0 |
| 26.0 | 58.4 | 645.0   | 183.0  | 56.7  | 17.7 |
| 36.0 | 63.3 | 1080.0  | 267.0  | 79.2  | —    |
| 44.0 | 67.2 | 2100.0  | 450.0  | 104.0 | —    |
| 52.0 | 71.1 | 25300.0 | 3090.0 | —     | —    |

TABLE 14

Example 8

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 2.0  | 40.84 | 30.50   | 17.40   | 6.32   | 3.18  |
| 7.0  | 42.67 | 81.90   | 22.80   | 8.05   | 4.11  |
| 12.0 | 44.50 | 125.00  | 32.40   | 10.50  | 5.99  |
| 18.0 | 46.69 | 297.00  | 55.80   | 17.10  | 14.00 |
| 23.0 | 48.52 | 252.00  | 70.00   | 24.20  | —     |
| 28.0 | 50.35 | 641.00  | 140.00  | 56.90  | 38.10 |
| 33.0 | 52.17 | 981.00  | 223.00  | 113.00 | —     |
| 38.0 | 54.00 | 1640.00 | 395.00  | 194.00 | —     |
| 43.0 | 55.83 | 9460.00 | 1420.00 | 372.00 | —     |
| 48.0 | 57.66 | —       | 1860.00 | 390.00 | —     |
| 52.0 | 59.12 | 9800.00 | 2590.00 | —      | —     |

TABLE 15

Example 9

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 2.0  | 51.7 | 71.2    | 13.6   | 5.4  | 3.4 |
| 2.0  | 51.7 | 85.8    | 21.2   | 8.3  | —   |
| 12.0 | 55.8 | 137.0   | 38.7   | 14.3 | 8.7 |
| 23.0 | 60.4 | 211.0   | 58.8   | 27.0 | —   |
| 28.0 | 62.4 | 583.0   | 145.0  | 59.6 | —   |
| 35.5 | 65.5 | 1030.0  | 188.0  | 63.5 | —   |
| 40.5 | 67.6 | 1850.0  | 330.0  | 86.8 | —   |
| 47.0 | 70.2 | 7050.0  | 935.0  | —    | —   |
| 52.5 | 72.5 | 36900.0 | 9080.0 | —    | —   |

TABLE 16

Example 10

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 3.0  | 57.4 | 509.0  | 34.0  | 13.7 | —    |
| 7.0  | 59.3 | —      | 39.3  | 20.0 | 8.6  |
| 14.0 | 62.7 | 755.0  | 86.3  | 36.7 | 11.0 |
| 18.0 | 64.6 | 1020.0 | 98.7  | 38.9 | —    |
| 25.0 | 68.0 | 1190.0 | 109.0 | 74.5 | —    |
| 28.0 | 69.5 | 1360.0 | 268.0 | 77.0 | —    |
| 35.0 | 72.8 | 3520.0 | 749.0 | —    | —    |
| 40.0 | 75.3 | 4120.0 | —     | —    | —    |
| 44.0 | 77.2 | —      | —     | —    | —    |

TABLE 17

Example 11

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 0.5  | 44.6 | 160.0  | 15.0   | 8.8   | 2.9  |
| 7.5  | 47.4 | 296.0  | 39.5   | 18.5  | 5.6  |
| 7.5  | 47.4 | 324.0  | 67.4   | —     | —    |
| 14.5 | 50.3 | 519.0  | 116.0  | 34.8  | 9.1  |
| 21.0 | 52.9 | 2240.0 | 327.0  | 62.2  | 14.6 |
| 26.0 | 54.9 | 4110.0 | 504.0  | 89.7  | 25.9 |
| 34.5 | 58.4 | 5590.0 | 633.0  | 325.0 | —    |
| 39.5 | 60.4 | 9110.0 | 1360.0 | 668.0 | —    |
| 46.0 | 63.0 | 8310.0 | 1330.0 | 628.0 | —    |
| 49.5 | 64.5 | —      | —      | —     | —    |

TABLE 18

Example 12

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 3.0 | 54.8 | — | 15.4 | 9.3 | 5.5 |
| 6.0 | 56.0 | — | 14.3 | 9.1 | 5.5 |
| 14.0 | 59.1 | 397.0 | 32.9 | 14.1 | 7.8 |
| 19.0 | 61.1 | 520.0 | 38.6 | 17.0 | 9.0 |
| 24.0 | 63.0 | 1210.0 | 49.5 | 21.5 | 11.0 |
| 30.0 | 65.4 | 1450.0 | 65.7 | 27.5 | 11.5 |
| 35.0 | 67.3 | 1750.0 | 95.9 | 37.7 | 12.6 |
| 38.0 | 68.5 | 2490.0 | 112.0 | 42.5 | 14.2 |
| 43.0 | 70.4 | 2990.0 | 134.0 | 49.4 | 15.9 |
| 48.0 | 72.4 | — | 195.0 | 61.7 | — |
| 53.0 | 74.4 | 6230.0 | 314.0 | 80.0 | — |
| 58.0 | 76.3 | 76800.0 | 712.0 | — | — |

TABLE 19

Example 13

| Time (min) | Calculated solids (%) | Shear rate 0.0997 s$^{-1}$ viscosity (Pa · s) | Shear rate 0.990 s$^{-1}$ viscosity (Pa · s) | Shear rate 9.7 s$^{-1}$ viscosity (Pa · s) | Shear rate 78.6 s$^{-1}$ viscosity (Pa · s) |
|---|---|---|---|---|---|
| 2.0 | 47.1 | 108.0 | 23.2 | 8.0 | 3.4 |
| 7.0 | 49.0 | — | 29.3 | 10.4 | 4.3 |
| 12.0 | 50.9 | — | 37.9 | 12.1 | 4.7 |
| 18.0 | 53.1 | 365.0 | 70.1 | 20.2 | 7.1 |
| 24.0 | 55.4 | 429.0 | 99.7 | 28.4 | 8.9 |
| 28.0 | 56.9 | 531.0 | 134.0 | 36.1 | 10.4 |
| 32.0 | 58.5 | 1170.0 | 324.0 | — | — |
| 36.0 | 60.0 | 3930.0 | 648.0 | 97.4 | 19.5 |
| 41.0 | 61.9 | 6870.0 | 884.0 | 124.0 | — |
| 46.0 | 63.8 | 11000.0 | 1450.0 | — | — |
| 50.0 | 65.3 | 15700.0 | — | — | — |

TABLE 20

Example 14

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 3.0 | 50.1 | 25.4 | 12.5 | 7.0 | 4.7 |
| 7.0 | 51.4 | — | 26.4 | 12.5 | 7.2 |
| 17.0 | 54.9 | 63.6 | 28.7 | 15.4 | 9.1 |
| 22.0 | 56.6 | 68.7 | 32.8 | 18.1 | 10.7 |
| 27.0 | 58.3 | 79.4 | 38.0 | 20.8 | 12.3 |
| 32.0 | 60.0 | 82.2 | 39.2 | 22.7 | — |
| 37.0 | 61.7 | 120.0 | 57.5 | 29.7 | — |
| 42.0 | 63.4 | 166.0 | 77.3 | 38.3 | — |
| 47.0 | 65.1 | 301.0 | 128.0 | 52.4 | — |
| 52.0 | 66.8 | 411.0 | 181.0 | 63.2 | — |
| 56.0 | 68.2 | 660.0 | 287.0 | 86.5 | — |
| 61.0 | 69.9 | 765.0 | 344.0 | — | — |
| 65.0 | 71.3 | 1490.0 | 463.0 | — | — |
| 69.0 | 72.6 | 3820.0 | 1130.0 | — | — |

TABLE 21

Example 15

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 1.00 | 42.19 | 33.10 | 14.80 | 7.36 | 5.61 |
| 7.00 | 43.99 | 66.50 | 23.40 | 10.60 | — |
| 12.00 | 45.60 | — | — | 11.50 | 7.32 |
| 16.50 | 47.13 | 141.00 | 42.30 | 17.70 | 10.50 |
| 21.00 | 48.75 | 187.00 | 50.10 | 19.50 | — |
| 27.00 | 51.03 | 392.00 | 84.70 | 28.90 | — |
| 31.50 | 52.83 | 601.00 | 108.00 | 36.10 | — |
| 38.00 | 55.58 | 677.00 | 138.00 | 45.40 | — |
| 42.00 | 57.35 | 862.00 | 158.00 | 55.30 | — |
| 47.00 | 59.66 | 2520.00 | 402.00 | 106.00 | — |
| 57.00 | 64.58 | 2130.00 | 414.00 | 118.00 | — |
| 62.00 | 67.19 | 12400.00 | 920.00 | — | — |
| 66.00 | 69.35 | 15400.00 | — | — | — |

TABLE 22

Example 16

| Time (min) | Calculated solids (%) | Shear rate 0.0997 s$^{-1}$ viscosity (Pa · s) | Shear rate 0.990 s$^{-1}$ viscosity Pa · s) | Shear rate 9.97 s$^{-1}$ viscosity Pa · s) | Shear rate 78.6 s$^{-1}$ viscosity (Pa · s) |
|---|---|---|---|---|---|
| 4.0 | 48.49 | 26.30 | 15.60 | 8.99 | 2.80 |
| 11.0 | 53.19 | 90.10 | 40.40 | 15.90 | 3.56 |
| 17.0 | 57.21 | 198.00 | 70.60 | 23.00 | 4.17 |
| 21.0 | 59.90 | 221.00 | 71.10 | 22.90 | 4.16 |
| 27.0 | 63.93 | 298.00 | 92.10 | 26.00 | 4.52 |
| 32.0 | 67.28 | 325.00 | 96.40 | 27.40 | 4.71 |
| 37.0 | 70.64 | 475.00 | 138.00 | 33.70 | 5.16 |
| 43.0 | 74.67 | 2470.00 | 269.00 | 42.90 | — |
| 49.0 | 78.70 | 4090.00 | 428.00 | 53.40 | — |
| 55.0 | 82.72 | 3560.00 | 410.00 | 64.20 | — |

TABLE 23

Example C17

| Time (mins) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 3.0 | 41.74 | 506 | 104 | 16 | 3 |
| 9.0 | 46.28 | 1465 | 341 | 59 | 13 |
| 14.5 | 50.99 | 5043 | 1334 | 305 | 51 |
| 23.0 | 59.16 | 16240 | 5356 | 910 | 193 |
| 29.0 | 65.50 | 22290 | 12750 | 2040 | 448 |

TABLE 24

Example C18

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 0. | 22.20 | 68 | 28 | 10 | 3 |
| 5.0 | 24.03 | 120 | 56 | 18 | 4 |
| 12.0 | 26.54 | 1156 | 422 | 82 | 15 |
| 18.0 | 28.93 | 5804 | 1588 | 212 | 33 |
| 24.0 | 31.81 | 8118 | 2073 | 289 | 69 |
| 31.0 | 36.13 | 12560 | 4273 | 568 | 116 |

TABLE 24-continued

Example C18

| Time (min) | Calculated Solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 38.0 | 41.88 | 12720 | 3278 | 415 | 78 |
| 44.0 | 48.27 | 33020 | 8738 | 1087 | 186 |

The invention claimed is:

1. An aqueous ambient temperature crosslinkable coating composition comprising a crosslinkable water-dispersible hyperbranched macromolecule(s) with a PDi less than 60 and a dispersed polymer(s) with a particle size in the range of from 25 to 1000 nm and an acid value below 150 mgKOH/g where the ratio of the crosslinkable hyperbranched macromolecule(s) to the dispersed polymer(s) is in the range of from 90:10 to 25:75 on a solids weight basis, and wherein said composition when drying to form a coating has the following properties at 23±2° C.:
  i) an open time of at least 20 minutes at 23±2° C.;
  ii) a wet edge time of at least 10 minutes at 23±2° C.;
  iii) a tack-free time of ≦15 hours at 23±2° C.;
  iv) a dust free time of ≦5 hours at 23±2° C.;
  v) 0 to 25% of co-solvent by weight of the composition; and
  vi) an equilibrium viscosity of ≦5,000 Pa·s, when measured using any shear rate in the range of from 0.09±0.005 to 90±5 s$^{-1}$ and an equilibrium viscosity of ≦3,000 Pa·s when measured using any shear rate in the range of from 0.9±0.05 to 90±5 s$^{-1}$, and an equilibrium viscosity of ≦1,500 Pa·s when measured using any shear rate in the range of from 9±0.5 to 90±5 s$^{-1}$, at any solids content when drying in the range of from 20 to 55% by weight of the composition and at 23±2° C.
wherein said hyperbranched macromolecule(s) has a solution viscosity ≦80 Pa·s, as determined from an 80% by weight solids solution of the crosslinkable hyperbranched macromolecule(s) in at least one of the solvents selected from the group consisting of N-methylpyrrolidone, n-butylglycol and mixtures thereof, using a shear rate of 90±5 s$^{-1}$ and at 50±2° C.; and
wherein said hyperbranched macromolecule(s) has a solution viscosity ≦100 Pa·s, as determined from a 70% by weight solids solution of the crosslinkable hyperbranched macromolecule(s) in a solvent mixture consisting of:
  i) at least one of the solvents selected from the group consisting of N-methylpyrrolidone, n-butylglycol and mixtures thereof;
  ii) water and
  iii) N,N-dimethylethanolamine;
  where i), ii) and iii) are in weight ratios of 20/7/3 respectively, using a shear rate of 90±5 s$^{-1}$ and at 23±2° C.; and
wherein said dispersed polymer(s) is at least one member of the group consisting of vinyl polymer; polyurethane; polyester; polyether; polyamide; polyepoxide; and polymer hybrids thereof.

2. An aqueous ambient temperature crosslinkable coating composition comprising
  i) 3 to 26% of a crosslinkable hyperbranched macromolecule(s) with a PDi less than 60 and crosslinkable oligomer(s) by weight of the composition of which at least 52 wt % is a crosslinkable hyperbranched macromolecule(s) with a PDI less than 60;
  ii) 0 to 6.5% of a non-crosslinkable oligomer(s) by weight of the composition;
  iii) 10 to 56% of dispersed polymer(s) with a particle size in the range of from 25 to 1000 nm and an acid value below 150 mgKOH/g by weight of the composition;
  iv) 0 to 15% of co-solvent by weight of the composition;
  v) 5 to 65% of water by weight of the composition;
  where i)+ii)+iii)+iv)+v)=100%
wherein said composition when drying to form a coating has the following properties:
  i) an open time of at least 20 minutes at 23±2° C.;
  ii) a wet edge time of at least 10 minutes at 23±2° C.;
  iii) a tack-free time of ≦15 hours at 23±2° C.;
  iv) a dust free time of ≦5 hours at 23±2° C.;
  v) 0 to 25% of co-solvent by weight of the composition;
  vi) an equilibrium viscosity of 5,000 Pa·s, when measured using any shear rate in the range of from 0.09±0.005 to 90±5 s$^{-1}$, and an equilibrium viscosity of ≦3,000 Pa·s when measured using any shear rate in the range of from 0.9±0.05 to 90±5 s$^{-1}$, and an equilibrium viscosity of ≦1,500 Pa·s when measured using any shear rate in the range of from 9±0.5 to 90±5 s$^{-1}$, at any solids content when drying in the range of from 20 to 55% by weight of the composition and at 23±2° C.;
wherein said hyperbranched macromolecule(s) has a solution viscosity ≦80 Pa·s, as determined from an 80% by weight solids solution of the crosslinkable hyperbranched macromolecule(s) in at least one of the solvents selected from the group consisting of N-methylpyrrolidone, n-butylglycol and mixtures thereof, using a shear rate of 90±5 s$^{-1}$ and at 50±2° C.; and
wherein said hyperbranched macromolecule(s) has a solution viscosity ≦100 Pa·s, as determined from a 70% by weight solids solution of the crosslinkable hyperbranched macromolecule(s) in a solvent mixture consisting of:
  i) at least one of the solvents selected from the group consisting of N-methylpyrrolidone, n-butylglycol and mixtures thereof;
  ii) water and
  iii) N,N-dimethylethanolamine;
  where i), ii) and iii) are in weight ratios of 20/7/3 respectively, using a shear rate of 90±5 s$^{-1}$ and at 23±2° C.; and
wherein said dispersed polymer(s) is at least one member of the group consisting of vinyl polymer; polyurethane; polyester; polyether; polyamide; polyepoxide; and polymer hybrids thereof.

3. An aqueous composition according to claim 1 or claim 2 wherein said composition has an equilibrium viscosity ≦5,000 Pa·s when measured using a shear rate in the range of from 0.09±0.005 to 90±5 s$^{-1}$ after a 12% increase of the solids content by weight of the composition when drying.

4. An aqueous composition according to claim 1 or claim 2 wherein the crosslinkable hyperbranched macromolecule(s) has a measured weight average molecular weight in the range of from 1,000 to 120,000 Daltons.

5. An aqueous composition according to claim 1 or claim 2 wherein the hyperbranched macromolecule(s) has a measured Tg in the range of from −90 to 100° C.

6. An aqueous composition according to claim 1 or claim 2 wherein the crosslinkable water-dispersible hyperbranched macromolecule(s) is self-crosslinkable.

7. An aqueous composition according to claim 1 or 4 wherein the crosslinkable water-dispersible hyperbranched macromolecule(s) is crosslinkable by autoxidation optionally in combination with Schiff base crosslinking.

8. An aqueous composition according to claim 7 wherein the crosslinkable water-dispersible hyperbranched macromolecule(s) contains autoxidisable groups and carbonyl functional groups.

9. An aqueous composition according to claim 1 or claim 2 wherein the crosslinkable water-dispersible hyperbranched macromolecule(s) is crosslinkable by Schiff base crosslinking optionally in combination with silane condensation.

10. An aqueous composition according to claim 1 or claim 2 wherein the crosslinkable water-dispersible hyperbranched macromolecule(s) is crosslinkable by silane condensation optionally in combination with autoxidation.

11. An aqueous composition according to claim 1 or claim 2 wherein the dispersed polymer(s) has a measured weight average molecular weight $\geq$130,000 Daltons.

12. An aqueous composition according to claim 1 or claim 2 wherein the dispersed polymer(s) has a measured weight average molecular weight <130,000 Daltons with the proviso that the dispersed polymer(s) has a solution viscosity >150 Pa·s, as determined from a 80% by weight solids solution of the dispersed polymer(s) in at least one of the solvents selected from the group consisting of N-methylpyrrolidone, n-butylglycol and mixtures thereof, using a shear rate of 90±5 s$^{-1}$ and at 50±2° C.

13. An aqueous composition according to claim 1 or claim 2 wherein the dispersed polymer(s) is a vinyl polymer.

14. An aqueous composition according to claim 1 or claim 2 wherein the dispersed polymer(s) has a measured Tg in the range of from −50 to 300° C.

15. An aqueous coating composition according to claim 1 or claim 2 comprising:
   i) 0 to 15% co-solvent by weight of crosslinkable hyperbranched macromolecule(s), crosslinkable oligomer(s), non-crosslinkable oligomer(s) and dispersed polymer(s);
   ii) 35 to 65% of crosslinkable hyperbranched macromolecule(s) by weight of crosslinkable hyperbranched macromolecule(s), crosslinkable oligomer(s), non-crosslinkable oligomer(s) and dispersed polymer(s); wherein the crosslinkable hyperbranched macromolecule(s) comprises 45 to 75 wt % of fatty acid groups; and wherein the dispersed polymer(s) has an acid value below 20 mgKOH/g.

16. An aqueous coating composition according to claim 1 or claim 2 comprising:
   i) 14 to 40% of a crosslinkable hyperbranched macromolecule(s) and crosslinkable oligomer(s) by weight of crosslinkable hyperbranched macromolecule(s), crosslinkable oligomer(s), non-crosslinkable oligomer(s) and dispersed polymer(s), of which at least 52 wt % is a crosslinkable water-dispersible hyperbranched macromolecule;
   ii) 0 to 10% of a non-crosslinkable oligomer(s) by weight of crosslinkable hyperbranched macromolecule(s), crosslinkable oligomer(s), non-crosslinkable oligomer(s) and dispersed polymer(s);
   iii) 50 to 85% of dispersed polymer(s) by weight of crosslinkable hyperbranched macromolecule(s), crosslinkable oligomer(s), non-crosslinkable oligomer(s) and dispersed polymer(s);
where i)+ii)+iii)=100%.

17. An aqueous coating composition according to claim 1 or claim 2 additionally comprising a pigment.

18. A coating obtained from an aqueous composition according to claim 1 or claim 2.

19. An aqueous composition according to claim 1 or claim 2 wherein the dispersed polymer(s) has a measured weight average molecular weight <130,000 Daltons with the proviso that the dispersed polymer(s) has a solution viscosity >150 Pa·s, as determined from a 80% by weight solids solution of the dispersed polymer(s) in at least one of the solvents selected from the group consisting of N-methylpyrrolidone, n-butylglycol and mixtures thereof, using a shear rate of 90±5 s$^{-1}$ and at 50±2° C. and the crosslinkable hyperbranched macromolecule(s) has a PDi less than 60.

* * * * *